US011120559B2

(12) United States Patent
Goncharov et al.

(10) Patent No.: US 11,120,559 B2
(45) Date of Patent: *Sep. 14, 2021

(54) COMPUTER VISION BASED MONITORING SYSTEM AND METHOD

(71) Applicant: CHERRY LABS, INC., Wilmington, DE (US)

(72) Inventors: Maksim Goncharov, Cupertino, CA (US); Nikolay Davydov, Los Altos Hills, CA (US); Stanislav Veretennikov, Cupertino, CA (US); Dmitry Gorilovsky, Berlin (DE)

(73) Assignee: Cherry Labs, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/609,179

(22) PCT Filed: Apr. 30, 2018

(86) PCT No.: PCT/US2018/030103
§ 371 (c)(1),
(2) Date: Oct. 28, 2019

(87) PCT Pub. No.: WO2018/201121
PCT Pub. Date: Nov. 1, 2018

(65) Prior Publication Data
US 2020/0193615 A1 Jun. 18, 2020

Related U.S. Application Data

(63) Continuation of application No. 15/647,129, filed on Jul. 11, 2017.

(30) Foreign Application Priority Data

Oct. 20, 2017 (GB) ........................ 717244

(51) Int. Cl.
G06T 7/20 (2017.01)
G08B 13/196 (2006.01)
(Continued)

(52) U.S. Cl.
CPC ............ G06T 7/20 (2013.01); G06K 9/00348 (2013.01); G06K 9/00771 (2013.01);
(Continued)

(58) Field of Classification Search
CPC ............................ G06T 7/20; G06K 9/00771
(Continued)

(56) References Cited

U.S. PATENT DOCUMENTS 9,519,969 B1    12/2016  Kusens
9,536,310 B1 *  1/2017   Kusens ............. G08B 21/0492
(Continued)

FOREIGN PATENT DOCUMENTS

WO    2014182898 A1    11/2014

OTHER PUBLICATIONS

Extended European search report received for EP Patent Application Serial No. 18790579.9 dated Dec. 2, 2020, 10 pages.

Primary Examiner — Amir Shahnami

(57) ABSTRACT

A monitoring system includes sensors that monitor activity within a designated territory. The sensors include visual sensors that make video recordings. A local processing system located within or proximate to the designated territory receives signals from the sensors. The local processing system processes and analyzes the signals from the sensors to produce messages that describe activity within the designated territory as monitored by the sensors. The messages do not include audio, visual or other direct identifying information that directly reveal identity of persons within the designated territory. A monitoring station outside the designated territory receives the messages produced by the (Continued)

local processing system and makes the messages available to external observers.

28 Claims, 18 Drawing Sheets

Related U.S. Application Data

(60) Provisional application No. 62/501,545, filed on May 4, 2017, provisional application No. 62/491,831, filed on Apr. 28, 2017.

(51) Int. Cl.
*G06K 9/00* (2006.01)
*H04N 7/18* (2006.01)
*G10L 15/08* (2006.01)
*G10L 25/48* (2013.01)
*G10L 25/27* (2013.01)
*G10L 15/26* (2006.01)

(52) U.S. Cl.
CPC ............ *G08B 13/196* (2013.01); *G10L 15/08* (2013.01); *G10L 15/26* (2013.01); *G10L 25/27* (2013.01); *G10L 25/48* (2013.01); *H04N 7/18* (2013.01); *H04N 7/181* (2013.01); *G06K 9/00281* (2013.01); *G06K 9/00355* (2013.01); *G06K 9/00369* (2013.01); *G06T 2207/10016* (2013.01); *G06T 2207/10024* (2013.01); *G06T 2207/20084* (2013.01); *G06T 2207/30232* (2013.01)

(58) Field of Classification Search
USPC ......................................................... 348/154
See application file for complete search history.

(56) References Cited

U.S. PATENT DOCUMENTS

| | | | |
|---|---|---|---|
| 10,137,984 B1* | 11/2018 | Flick | G08G 5/006 |
| 2006/0064384 A1* | 3/2006 | Mehrotra | G08B 13/19608 |
| | | | 705/57 |
| 2011/0228094 A1 | 9/2011 | Cheng et al. | |
| 2012/0127304 A1 | 5/2012 | Tsuji et al. | |
| 2015/0213702 A1* | 7/2015 | Kimmel | G06T 7/20 |
| | | | 382/103 |

* cited by examiner

COMPUTER VISION BASED MONITORING SYSTEM AND METHOD

BACKGROUND OF THE INVENTION

1. Field of the Invention

The field of the invention relates to electronic systems for monitoring, security and control. One implementation of the present invention relates to a method and a computer-based system for representing data from computer vision systems.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Security, monitoring and control systems equipped with cameras and additional sensors can be used to detect various threats such as intrusions, fire, smoke, flood, and so on. Motion detection is also often used to detect intruders in vacated or occupied building or home environment. Detection of an intruder may lead to an audio or silent alarm and contact of security personnel.

Due to the fact that computer-based technologies in the field of security have rapidly developed in recent years, a huge variety of security, monitoring and control systems equipped with cameras and additional sensors exist. Conventional security, monitoring and control systems may comprise a user interface unit that allows to user to view information (e.g. video and audio signals) from a set of cameras and additional sensors on a display of a user processor-controlled device. Due to the fact that the common approach is to scan the video and audio information, current solutions often require the user to watch the video and hear the audio information in order to understand what people do on the territory under surveillance and understand which screen to use during movements of surveillance object.

As a result, a user of such a system may have to continuously view all data from cameras to identify something suspicious and have an opportunity to give a response to the monitoring system based on the viewed information by means of GUI. Moreover, the video streams from different cameras may be shown on the display simultaneously as a grid of pictures. That's why a user often has to shift his/her gaze from one picture to another picture to catch all the information and to receive an overview of the situation in the observed territory.

There is a need for a compact and informative high-level interface that would not require the user to carefully watch a video in order to understand what people do in an area under surveillance.

The present invention addresses the above vulnerabilities and also other problems not described above.

SUMMARY OF THE INVENTION

A first aspect of the invention is a monitoring system comprising:

sensors that monitor activity within a designated territory, the sensors including visual or image sensors, for example sensors that make video recordings;

a local processing system located within or proximate to the designated territory, the local processing system receiving signals from the sensors, the local processing system processing and analyzing the signals from the sensors to produce messages that describe activity within the designated territory as monitored by the sensors, the messages not including audio, visual or other direct identifying information that directly reveal identity of persons within the designated territory; and a monitoring station outside the designated territory, the monitoring station receiving the messages produced by the local processing system and making the messages available to external observers.

Optional features include any of the following.

The messages describe actions performed by a person or animal within the designated territory sufficiently to allow an external observer to determine when external intervention is required.

the monitoring station produces an alarm when the messages describe actions performed by a person or animal that indicate an external intervention may be required.

the sensors are selected to monitor children, disabled, sick or old persons.

the monitoring station forwards to the local processing system a query from an external observer, the local processor responds with a message, wherein contents of the message are based on activity within the designated territory detected by processing and analyzing the signals from the sensors.

the monitoring station produces an alert when the messages indicate a predetermined gesture or predetermined phrase is detected by the sensors.

the monitoring station cancels the alert when the messages indicate a predetermined cancelation gesture or predetermined cancelation phrase is detected by the sensors.

the local processing system internally identifies bodies of people and animals within the designated territory based on video data using at least one of the following techniques:

face metric identification that identifies and records facial features; clothes metric identification that detects and records types of clothes on a body; body metric identification that detects and records body shapes;

activity metric identification that detects and records current activity of a body; hair-cut metric identification that detects and records hair-cut style;

tool metric identification that detects and records objects held or in near vicinity to a body.

the local processing system recognizes changes made to bodies within the designated territory and updates affected metric identifications.

the local processing system analyzes kinetic motion of identified bodies to insure movements consistent with laws of physics to detect and resolve inconsistencies when internally identifying bodies.

the local processing system additionally uses audio data to internally identify bodies of people and animals within the designated territory, the audio data including timbre metrics and relative sound amplitudes.

the local processing system internally identifies bodies of people and animals within the designated territory based on video data using more than one of the following techniques:

face metric identification that identifies and records facial features;

clothes metric identification that detects and records types of clothes on a body; body metric identification that detects and records body shapes;
activity metric identification that detects and records current activity of a body;
hair-cut metric identification that detects and records hair-cut style;
tool metric identification that detects and records objects held or in near vicinity to a body.
the designated territory includes an area in at least one of the following:
a school,
a prison,
a hospital,
a shopping mall,
a street,
an office,
a parking lot.
the designated territory comprises a plurality of rooms, the local processing system constructing a layout plan of the territory using video data from the sensors.
the local processing system additionally uses audio data to construct the layout plan.
when constructing the layout plan of the territory, the local processing system utilizes at least one of the following:
estimates of room geometry based on detecting horizontal and vertical lines;
detection of major objects within field of view of video sensors;
neural network algorithms to recognize a room type form based a database of known room types;
measurements based on requested configuration activities of a user within a room;
configuration audio signals detected by audio sensors.
Another aspect is a method for monitoring activity within a designated territory, comprising:
using sensors to make video recordings;
forwarding signals from the sensors to a local processing system located within or proximate to the designated territory,
using the local processing system to process and analyze the signals from the sensors to produce messages that describe activity within the designated territory as monitored by the sensors, where the messages do not include audio, visual or other direct identifying information that directly reveal identity of persons within the designated territory;
sending the messages to a monitoring station outside the designated territory, the monitoring station making the messages available to external observers.
Optional steps include any of the following.
producing an alert by the monitoring station when the messages indicate a predetermined gesture or predetermined phrase is detected by the sensors.
internally identifying bodies of people and animals within the designated territory based on video data using one or more of the following techniques:
face metric identification that identifies and records facial features,
clothes metric identification that detects and records types of clothes on a body,
body metric identification that detects and records body shapes,
activity metric identification that detects and records current activity of a body,
hair-cut metric identification that detects and records hair-cut style, and
tool metric identification that detects and records objects held or in near vicinity to a body.
recording audio data by the sensors, the audio data being used to internally identify bodies of people and animals within the designated territory, the audio data including timbre metrics and relative sound amplitudes.

BRIEF DESCRIPTION OF THE FIGURES

Aspects of the invention will now be described, by way of example(s), with reference to the following Figures, which each show features of the invention.

DETAILED DESCRIPTION

Figure 1:
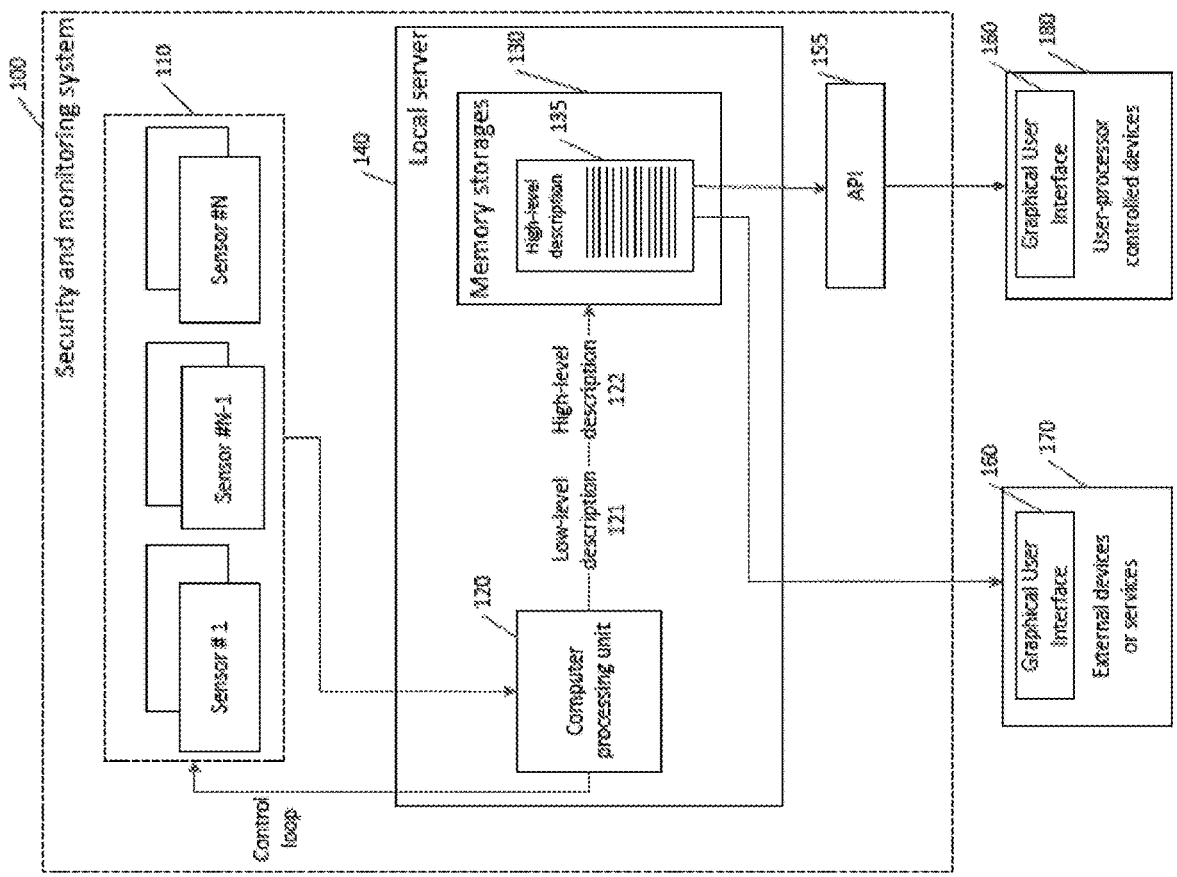
FIG. 1 illustrates a monitoring system.

Example aspects are described herein in the context of a monitoring system and a method for an object is identification, an object's location detection as well as, recognition of a type of an activity and time of the activity of the detected object. In particular, the system is able to collect data from a plurality of sensors, process the data and send alerts based on the processed data to prevent or react to emergency situations.

For example, the described system may react automatically in situations such as an appearance of an unknown person in the house during night hours, an appearance of an unknown person in the master bedroom during day hours, a broken window, a failure to shut off water in a bathroom, a baby crawling into a fireplace, a baby approaching a swimming pool with no adults in the vicinity, a person who has fallen down, a person who is lying on a floor or in any other unusual location for a long time, a person crying for help, a child not returning from school at a normal time, and so on.

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Moreover, various features are described which may be exhibited by some embodiments and not by others. Similarly, various requirements are described which may be requirements for some embodiments but not other embodiments. In the context of the present invention, the terms "a" and "an" mean "at least one".

The term "frame" herein may refer to a collection of video data, audio data and other available sensory data, captured from all the cameras and sensors of the monitoring system in one particular time moment, for example, in one second.

The term "object" herein may refer to an object observed by the monitoring system. The term "object" may refer to an animate object, for example, a person (in other words, an individual, a human), a pet, etc. Objects may be "known"—which means they are included into a system internal database of known people and pets, in other words with ID and characteristics that are stored in the memory of the system, or "unknown"—which means that the object is not included into the database, or characteristics that are new for the monitoring system.

The term "territory" herein may refer to territory to be observed by the monitoring system. For example, the term "territory" may refer to a living quarter, to an apartment, to a building of a hospital, a school, an old people's home, a private house, to an adjoining territory, etc. It may be a physical and logical location.

The term "user" herein may refer to any person or group of people who may interact with the monitoring system. For example, a user may be an owner of a house, or a user may be a medical officer who takes care of elderly persons.

The term "zone" herein may refer at least to the part of the territory, for example, to a swimming pool, a fireplace, a room, etc.

The term "forbidden" zone herein may refer to a specific part of the territory to be observed by the monitoring system that is not allowed for a specific object. The monitoring system may react if it detects crossing of the border of the forbidden zone by an object.

The term "allowed" zone herein may refer to a specific part of the territory observed by the monitoring system that is allowed for a specific object.

The term "abnormal event" herein may refer to pre-defined types of activities within a frame to which the monitoring system may react. For example, pre-defined types of activities may include motions related to the intrusions (such as breaking into a window, fighting, presenting weapons, etc.). Pre-defined types of activities also may relate to activities that may be typical for a specific medical condition (for example: falling down, agonizing, visible blood or injury, furniture movements, etc.) and so on.

The term "alarm condition" herein may refer to a set of rules, describing a situation that may be considered as dangerous or unsafe for normal wellbeing.

In one embodiment, some of the rules may be predefined by the monitoring system. In another embodiment, the owner or other users may create and/or adjust rules. A defined set of rules depends on the scenarios or application of the monitoring system.

There is a plurality of scenarios for how the monitoring system may be exploited. One of the illustrative examples is equipping a private house with the given monitoring system to protect people from a dangerous situation, to safeguard lives by detecting abnormal events and to send alert notifications to external services, such as police, or a user processor-controlled electronic device.

For example, the monitoring system may protect from physical break-ins, protect people from medical problems, react if a baby is approaching a swimming pool with no adults in the vicinity, and react when someone collapses or has a stroke.

Another illustrative example is equipping a hospital or elderly person home. The monitoring system monitors a person of interest in a room to react and call an alert or medical officer in case the monitored person has a stroke, loses consciousness, falls, faints and so on.

The monitored person may also provide an alarm signal to trigger an alarm notification. The term "alarm signal" herein may refer to a specific gesture, or a specific sound signal, which may turn the monitoring system into the alarm mode and initiate the procedure of sending the alarm notification to the external services or devices. The alarm signal is needed in the case when the monitoring system is not able to recognize the problem in an automatic way, then the monitored person may signal about the problem.

FIG. 1 illustrates an exemplary monitoring system 100. Those of ordinary skills in the art will appreciate that hardware and software units depicted in FIG. 1 may vary without limitation of a scope of the disclosure.

In one embodiment, a monitoring system 100 includes a set of sensors 110 which may include at least video cameras, infrared lighting for night vision, and a plurality of microphones. Moreover, the described monitoring system may have a gyroscope, a motion detector, a smoke sensor, a thermographic camera (heat detector), a detector of intrusion (through the window or doors), a thermometer, a smell detector and other sources of information. Sensors 110 may be allocated within the observed territory in such way that they capture signals including all information related to the activity within the territory. For example, sensors 110 of different types produce dense representation of signals and augment data received from other sensors to restore a complete frame. The list of detectors is illustrative.

Additionally, a motion sensor may be used to record the camera positioning and adjust in case of replacement. An accelerometer/magnetometer may be used to adjust the camera according to the compass points. A pressure sensor may be used to confirm the camera positioning height (the same mechanic phones use to determine their positioning. More than one set of lenses (such as visible light and infra-red) may be used to create a depth picture along with creating a stereoscopic image.

Figure 2:
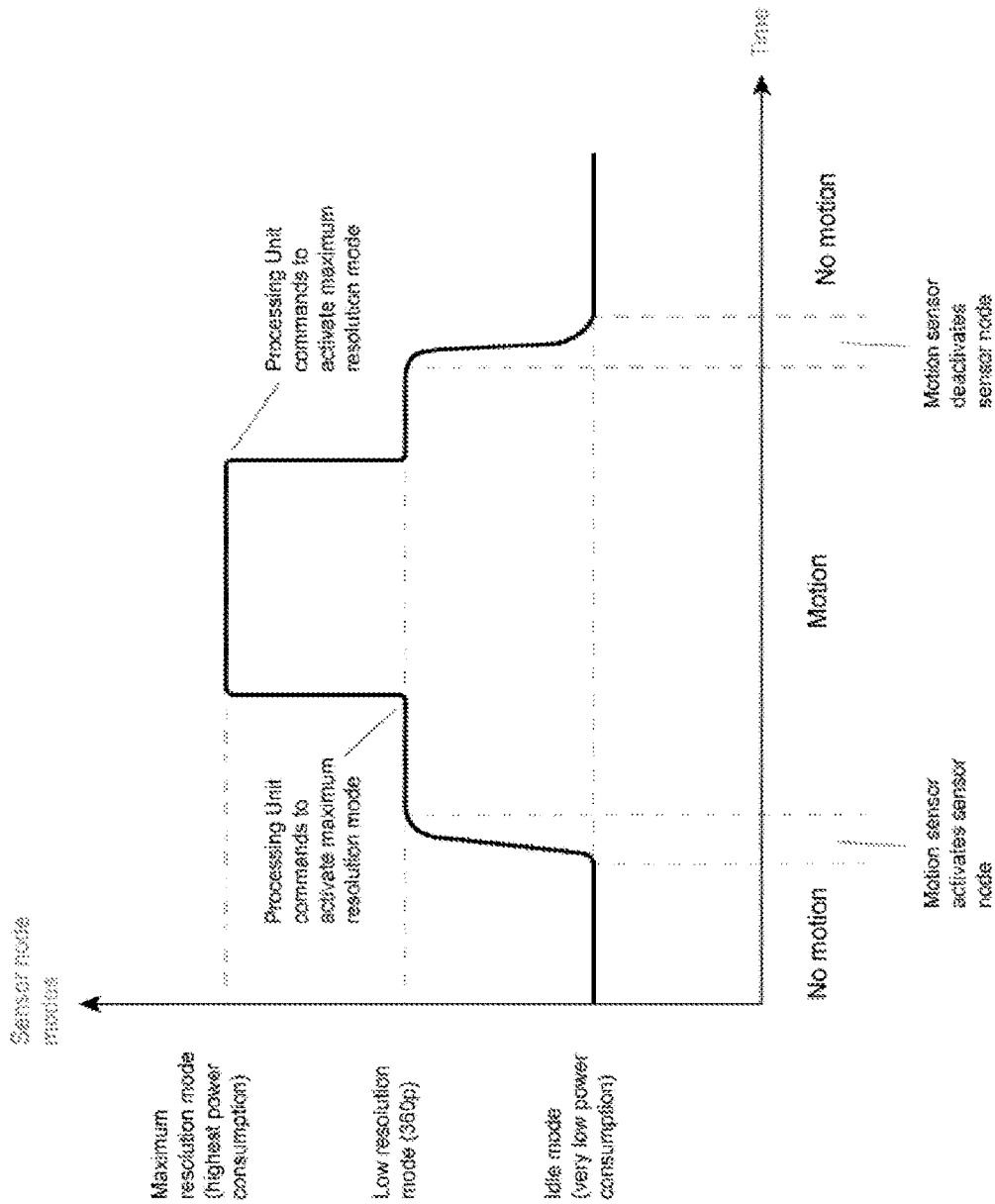
FIG. 2 illustrates a sensor node activating diagram.

There are several camera modes, and the set of sensors (or sensor node) can utilize a state transition diagram as shown in FIG. 2. Examples of camera modes are, but not limited to:

idle mode (very low power consumption to conserve energy), low resolution mode (for example 360p), and maximum resolution mode (highest power consumption). When motion is detected by one or more sensors, the camera mode may switch from one mode to another mode. A low quality video mode may also preserve energy and a node's full potential is used only when required.

The main camera mode provides the most battery life, since the sensor array uses the infra-red filtered lens during well-lit periods in a low quality mode. For example, a low quality mode may mean the following:

5-30 frames per second (changeable by the central computer unit based on the recognizable events happening);
Low resolution (360p);
Single lens—no stereo picture;
No additional sensors active.

By default, a sensor node is in the idle mode, meaning no video recording or feed takes place. It can be activated by movement within the active area.

Once a moving object triggers to the motion sensor, it activates a low quality video feed. If the central computing unit requests a high quality video feed, the sensor node switches to the high quality mode.

The high quality mode is triggered by the computer processing unit 120. It can utilize the full capability of a single lens array to output FULL HD 60 FPS video or UHD video feed with a lower number of frames per second. This mode is automatically used for facial recognition, can be requested by the user or required by the central computing unit in case of an emergency situation.

To ensure correct depth of field, a sensor node can utilize both lens arrays to create a stereoscopic picture and compile it into a single image before ISP (image signal processor) utilizing an internal FPGA. A night mode utilizes the lens array with an infrared filter along with the infra red lighting.

Figure 3:
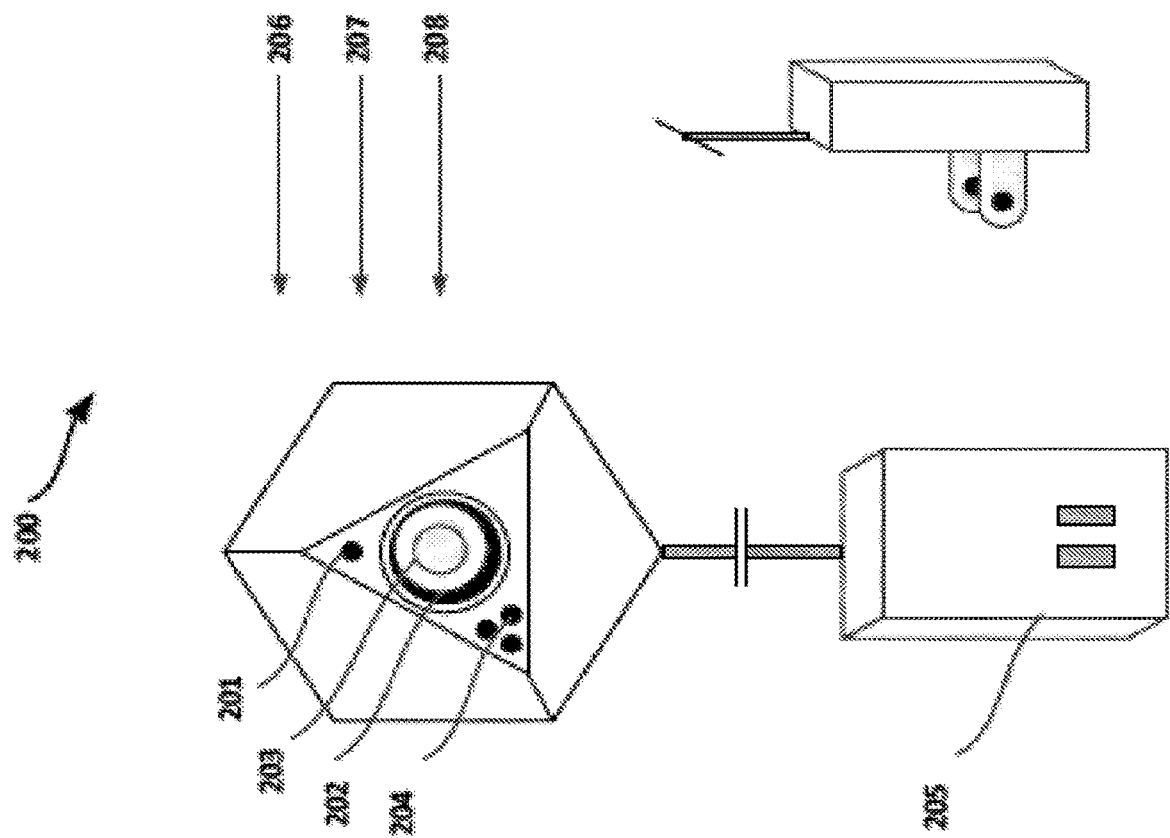
FIG. 3 illustrates an exemplary sensor.

FIG. 3 illustrates an exemplary sensor, and in particular, an exemplary video camera 200 in accordance with an implementation. The video camera 200 includes, for example, a speaker 201, an infrared night light 202, a lens 203, a microphone 204, a pass-through adapter 205, a Wi-Fi unit 206, an ARM controller 207 and a backup battery 208.

Referring to FIG. 1, computer processing unit 120 interacts with a set of sensors 110 administering them by a control loop. For example, computer processing unit 120 is a local processing system located within or proximate to a designated territory in which sensors 110 monitor activity. For example, computer processing unit 120 receives signals from sensors 110, and processes and analyzes the signals to produce messages that describe activity within the designated territory as monitored by sensors 110. The messages do not include audio, visual or other types of data that directly reveal the identity of persons within the designated territory. For example, the designated territory can be an area in a school, a prison, hospital, a shopping mall, a street, an office, a parking lot or another type of area.

The processed data received from the set of sensors 110 may be stored in memory 130.

Machine learning techniques may also be used to provide the ability to determine who is home and if that person is a member of the household through training the computation unit using pictures and video.

The set of sensors are connected to a computer processing unit hub via a Wi-Fi connection. For security reasons the footage used for machine learning purposes does not leave the household when a central hub is present. However a system can be operational without the central hub. The central hub may be a standard PC with a small form factor GPU running the machine learning algorithms.

The computer processing unit preferably has the following interfaces:

Two Wi-Fi connectivity modules—one of the modules is used to connect to the Internet, while the other one to create a separate channel for the camera node's traffic;
Ethernet;
Bluetooth™—direct connection to a user's phone for the purpose of adjusting settings and controlling the system and as a reserve communication channel.

In case the computer processing unit is not installed, the system may operate through a cloud-provided server-based system but using more of the broadband connection.

The computer processing unit 120 includes a charging station. Battery remains at a 50% charge while being installed into the charging station. If a sensor node sends a signal to the computer processing unit 120 indicating low power levels, the battery is charged up to a 100% prolonging the battery life and optimizing the battery life span. A separate LED indicator situated on the battery body shows the charge level only when removed from the sensor node.

For example, the computer processing unit 120 internally identifies bodies of people and animals within the designated territory based on one or a combination of video data using face metric identification that identifies and records facial features, clothes metric identification that detects and records types of clothes on a body, body metric identification that detects and records body shapes, activity metric identification that detects and records current activity of a body, hair-cut metric identification that detects and records hair-cut style tool metric identification that detects and records objects held or in near vicinity to a body, or another technique.

For example, a list of connected devices can be used to distinctively identify people within the household by studying the list of devices present in the presence of a certain amount of people and the changes to that list while people are moving in and out of the operational zone.

For example, computer processing unit 120 recognizes changes made to bodies within the designated territory and updates affected metric identifications.

For example, computer processing unit 120 analyses the kinetic motion of identified bodies to insure movements consistent with laws of physics to detect and resolve inconsistencies when internally identifying bodies. For example, computer processing unit 120 additionally uses audio data to internally identify bodies of people and animals within the designated territory where the audio data includes timbre metrics and relative sound amplitudes.

Figure 4:
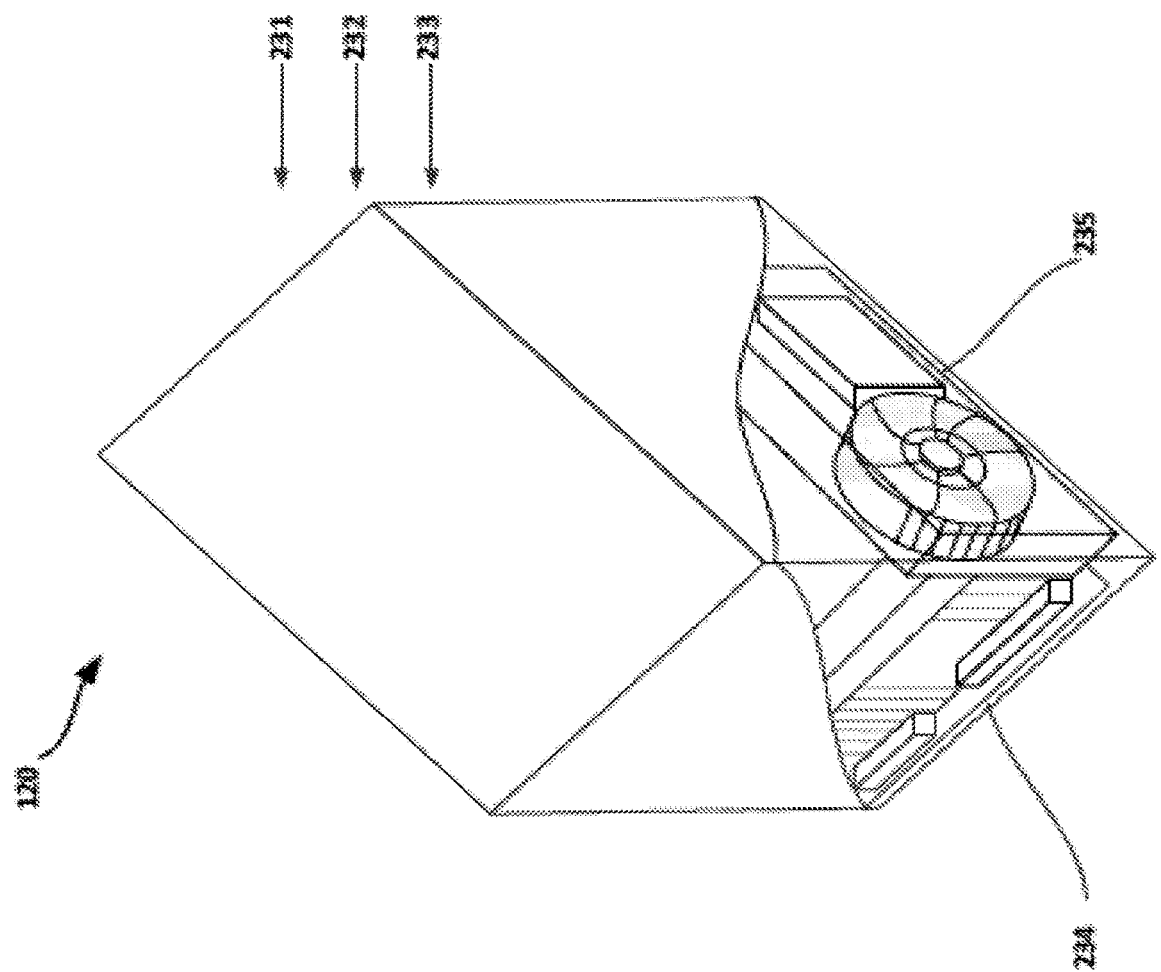
FIG. 4 illustrates an exemplary computer processing unit.

FIG. 4 provides an example of the computer processing unit 120 in accordance with an implementation. The processing unit 120 may include, for example, a Wi-Fi router 231, a backup battery 232, a backup mobile internet module 233, a CPU board 234 and a GPU board 235.

In one embodiment, the computer processing unit 120 may be included in a local server 140. The term "local" means that local server is allocated within the territory observed by monitoring system 100. Described allocation of the processing unit and a local server doesn't overload internet channels; increasing the effectiveness of monitoring system 100. Privacy, data protection and data security are protected, for example, by data encryption. Additionally, privacy, data protection and data security are enhanced by the independence of monitoring system 100 from the Internet. Such independence from the Internet makes monitoring system 100 more confidential and reliable for users.

Monitoring system 100 does not send any private source data to external storage resources such as a cloud storage system or some other external storage systems located outside the territory.

Signals from the set of sensors 110 are transferred to the central computer processing unit 120 where the signals are processed and analysed. Computer processing unit 120 processes signals from sensors 110 to create low-level description of source incoming data. The low-level video description may include recognized objects—animate and inanimate—on different levels of a hierarchy. For example, the low-level video description may include descriptions of a body, body parts, skeleton joint coordinates, body shape measurements and samples of clothes, skin colors and textures on different parts of the body. For example, the low-level video description may also include descriptions of a face, coordinates of facial features, a type of the haircut, external objects (such as earrings), and samples of color and texture on lips, ears, hairs, eyes and teeth. For example, the low-level video description may also include descriptions of hand, coordinates of finger joints, types of the finger and toe nails, samples of the color and texture of the fingers, the nails and the palms. A low-level audio description may include, for example, recognized sounds on different levels of hierarchy. For example, low level audio description may include a single sound or morpheme, its spectrum, its relative amplitude on different microphones, or a longer duration audio sound which is recognized as known, such as, for example, a phrase to set an alarm on or off, or a phrase to enable/disable surveillance. Based on the low-level description 121 of data, high-level description 122 may be generated. The processed data received from the sensors 110 is stored in memory 130 in an accurate high-level description file 135, for example, in a textual log-file. In one embodiment, the information in the high-level description file 135 may contain the following information: "1:53 pm 13 sec: Person ID="John", Person Location=(x,y); Person activity='reading'". For an example of activity detection used to create low-level description algorithms (See Serena Yeung, et al. "Learning of Action Detection from Frame Glimpses in Videos", arXiv:1511.06984, 2015.)

The high-level description 135 may be extracted from the memory storage and processed at any time. For example, the high-level description file 135 may be customized and transferred into the script of any other external system. For example, the information from the file 135 may be processed from text to speech.

Computer processing unit 120 uses the source signal (video signal, audio signal, data from smoke detector, etc.) from sensors 110 to recognize and differentiate objects within a frame, and to identify the type and spatial position of the detected objects. The results produced by computer processing unit 120 are stored in an accurate high-level description file 135. Computer processing unit 120 may produce people and pet identification and re-identification units based on face metrics, body metrics, clothes metrics, hair-cut metrics, pose and limb coordinate estimations, detection of people and pets spatial position, detection of activity, detection of controlling visual gestures and audial signals, detections of specific medical conditions, detection of the "scenario" of people and pets interaction with the surrounding objects, and so on.

For example, spatial localization based on audio signal works uses relative amplitudes. That is, as an object moves towards and away from a microphone, the detected amplitude of an audio signal based on sound from the object varies based on location. The amplitude will vary dependent upon which microphone generates the audio signal based on the sound. When computer processing unit 120 receives audio signal samples pertaining to the spatial position of an object and the corresponding microphone signals amplitudes collected during a calibration stage and further updated during system operation, computer processing unit 120 can statistically correlate the distribution of the audio signal amplitudes at all the microphones on the territory with the known spatial locations of the object. The result of this statistical correlation is a mapping of the space of audial amplitudes to the plan of territory. So, when an object for a period is not seen by any of the video cameras, monitoring system 100 may restore the object spatial location by using the microphone signals and the mapping performed during the calibration stage.

Computer processing unit 120 interacts with a memory storage unit 130 to store the processed information, for example, in the form of a high-level description 135 and to extract stored information for further detailed analysis. Memory storage unit 130 may include, for example, a database of known persons 474, a short-term memory unit of the previous landmark positions 425, a short-term memory of faces, bodies and clothes metrics 435, a short-term memory of geometrical positions and personal identifications 485, a database of pre-set alert conditions 492, and a short-term memory of audio frames 850. To increase the reliability of monitoring system 100, the source unprocessed signals from the sensors may be stored in the memory just for a short period of time.

Monitoring system 100 may include an Application Programming Interface (API) module 155 that provides opportunity for interaction of a "user" with monitoring system 100. Applications on user-processor controlled electronic devices 180 by means of a graphical user interface (GUI) 160 may access the server 140 through the Application Programming Interface (API) 155—a software interface. Interaction of a user with monitoring system 100 may be performed for example, through the mobile application or through the user interface of a desktop program 180. By means of a graphical user interface of user-processor controlled electronic devices 180, a user may send the request to monitoring system 100 and monitoring system 100 may perform actions in accordance with the request and send a response to the user based on the results of data analysis received from sensors 110 and processed by the processing unit 120. One embodiment, for example may be represented by a client-server system or a request-response model.

Graphical User Interface (GUI) 160 on a user-processor controlled device 180 provides a user with the possibility to receive alerts from monitoring system 100, to view the collected, stored and analysed data from sensors, to calibrate monitoring system 100, to define rules that describe the dangerous situation and to add new objects to the database of monitoring system 100.

In one embodiment, signals from the set of sensors 110 may be represented in real time via the display of a user-controlled device (mobile phone, laptop, smartphone or personal computer, etc.) without any modifications. In other words, monitoring system 100 may provide information pertaining to what is happening at a home to a user. For example, GUI 160 of the system on the user controlled device may display all captured video and images from all cameras and play the recorded audio tracks. The user may give a response to monitoring system 100 based on the viewed information by means of GUI 160. For example, the user may request monitoring system 100 to provide more detailed information from sensors 110, to give a report based on the analysis of data from sensors 110, to call an alert or to call off an alert, to call the police, ambulance or emergency service, or so on. In other words, monitoring system 100 gives access to the user to view information, to obtain access to stored data in memory storage 130 of server 140 and to control monitoring system 100.

In one embodiment, the user may be provided with the results of the information processed by unit 120 data. The high-level description 135 of one or several frames may be pre-processed to display the information on a user-controlled device 180. The information may be represented in several ways, for instance in the form of a textual report, in the form of a map, in the form of a graphical reproduction or cartoons, or in the form of a voice that describes main events during the requested time period.

For example, the textual report may include textual information about the main events. For example, the textual report may say: "John woke up at 9 am, went to the kitchen, had a breakfast with nurse, spent 2 hours in the study room, spent one hour nearby the swimming pool."; "A nurse cooked breakfast at 8.30 am, cleaned the rooms, spent 2 hours with John in room B, . . . "; "Patient Mary G. took a medicine at 8 am, read book 3 hours, left a room at 1 pm, . . . "; and so on.

A user's desktop or mobile applications 160 in processor-controlled user devices 180 exchanges information with monitoring system 100. Electronic communications between computer systems generally includes packets of information, referred to as datagrams, transferred from processor-controlled user devices 180 to a local server and from a local server to processor-controlled user devices 180. The elements of the system exchange the information via Wi-Fi.

Other possible channels of information transfer may also be used.

In comparison to other known electronic communications, the current interaction of a user/client with monitoring system 100 involves adding and storing information within monitoring system 100 in such way that this information is stored in the memory storage of the local server 140 that is located inside the territory where monitoring system 100 is installed. This ensures privacy for the information about the personal life of a user of the given system.

Monitoring system 100 is able to interact with external systems or services, for example, with smart house systems, with the police systems, with medical services, and so on. For example, the described system for monitoring, security and control 100 send alert notification to the external services and system 170, user processor-controlled devices 180 based on the analysis of the data from sensors 110. The alerts may be represented to the user with help of a GUI on the display for example. For example, external services and system 170 is a monitoring station that receives messages produced by computer processing unit 120 and makes the messages available to external observers.

For example, the messages describe actions performed by a person or animal within the designated territory sufficiently to allow an external observer to determine when external intervention is required. For example, external devices or services 170 includes a monitoring station that produces an alarm when the messages from computer processing unit 120 describe actions performed by a person or animal that indicate an external intervention may be required. For example, sensors 110 are selected to monitor children, disabled, sick or old persons. For example, the monitoring station forwards to computer processing unit 120 a query from an external observer and computer processing unit 120 responds with a message, wherein contents of the message are based on activity within the designated territory detected by processing and analysing the signals from sensors 110.

In case of any pre-determined event occurring, the owner can be notified via the mobile device. Notifications can be accompanied by the video or pictures provided by the cameras according to settings defined by the user. To prevent false positive results, a user can view the video feed from the camera. After each situation, the system remembers the result to prevent future false positives.

Calibration is an initial step of running of monitoring system 100 within an unknown territory. During the calibration, monitoring system 100 identifies basic parameters of the territory, identifies the type of the territory, creates the map of the territory, and so on. For example, when the designated territory includes a plurality of rooms, the local processing system constructs a layout plan of the territory using video data from the sensors. For example, the local processing system additionally also uses audio data to construct the layout plan. For example, estimates of room geometry are based on detecting horizontal and vertical lines.

For example, major objects within the field of view of video sensors are detected and used to construct the layer. For example, neural network algorithms are used to recognize a room type form based on a database of known room types. For example, measurements can be based on requested configuration activities of a user within a room.

Figure 5:
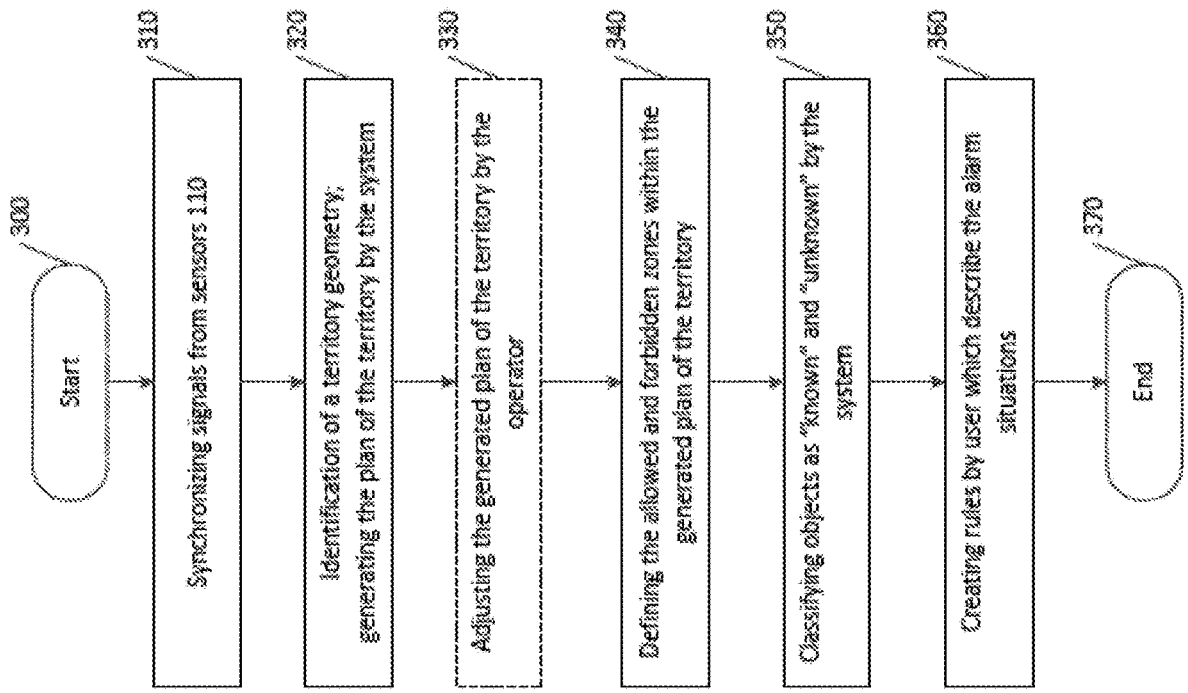
FIG. 5 illustrates an exemplary block diagram of the system calibration.

FIG. 5 illustrates an exemplary block diagram of a calibration method of monitoring system 100 in accordance with one or more aspects. The method of the calibration of monitoring system 100 starts at step 300 and proceeds to step 370.

At step 310, source signals from a set of sensors 110 are synchronized.

One of the key characteristics of monitoring system 100 is the synchronization of all signals with time. Time is a source of information which is used as additional coordinates for further analysis.

At step 320, monitoring system 100 determines the geometrical parameters of the territory. Particularly, monitoring system 100 may identify allocation of rooms inside the observed building, sizes of the rooms, their functions, the furniture inside the rooms, the parameters of adjoining territory, for example, garden, garage, playing ground etc. Monitoring system 100 may also determine an allocation of windows and entries, source of light, fireplaces, stairs, connection with other rooms, etc.

The type and function of territory may influence how monitoring system 100 will process the data from sensors, the type of abnormal event within the frame. For example, if the territory represents a private home, the scenarios will be different from the scenarios of monitoring system 100 in the hospital for elderly persons. Type and function of the territory may be indicated by the user at step 330.

At step 320, monitoring system 100 may generate the plan of the territory based on the identified geometrical parameters. The estimation of the room geometry may be based on detecting horizontal and vertical lines, angle positions of the gyroscopes, detection of major objects within field of view of video sensors, and neural network algorithms to recognize a room type form based on a database of known room types.

Alternatively, a plan of the territory may be generated in other possible ways without limiting the scope of the present invention. For example, a plan of the territory may be generated by a user.

If the sensor node is removed from a previously designated position, it activates the sensor array and re-maps the surrounding area to redefine its position in space and relative to other sensor nodes while being moved.

If a new sensor node is added to the monitoring system—it configures itself automatically through adding its unique ID to the database of the sensor nodes (included into the system). It is automatically routed BLE and Wi-Fi access data by the central computing unit.

Sensor nodes provided with the system are configured the same way—the only difference is that sensor nodes sold together are written in an online database and transferred to a computing unit on configuration In one of the embodiments, a user may be requested during calibration to walk from one video camera to another, and from one microphone to another, allowing monitoring system 100 to create the plan of the territory based on the measurements as the user moves along a known trajectory. Monitoring system 100 also, for example, correlates the relative sound amplitudes of all the microphones with the spatial location of the object on a territory plan. A designed plan may include all available information about the territory, including, for example, the allocation of rooms, their geometrical sizes, windows, doors, stairs, source of light, the type of room, etc. In other words, the generated plan depicts the graphical image of the territory and is created to schematically represent to a user the received and processed data from the sensors of monitoring system 100.

Generating of a territory map may be performed in a semi-automatic way based on the data from the sensors 110. In one embodiment, monitoring system 100 creates the description of the preliminary plan and the user may correct the results of the created plan at step 330 to increase accuracy of identified parameters of the territory. Step 330 is optional and may be skipped. In one embodiment, monitoring system 100 creates the description of the living space in automatic way without operator assisting.

The plan of the territory may be conventionally divided into "forbidden" and "allowed" zones. In one embodiment, the "forbidden" and "allowed" zones may be common for all observed objects. In another embodiment "allowed" and "forbidden" zones may be specifically indicated for every specific object. For example, a child may have "forbidden zones", such as swimming pool, kitchen, stairs etc. A nurse and housemaid may have different "forbidden zones" such as, for example, a private study room or a bedroom.

At step 340, monitoring system 100 may automatically define forbidden zones for specific objects. For example, a fireplace and a pool may be defined as forbidden for a child. The operator may also indicate which zones are forbidden for which objects. For instance, user may tag on the plan "forbidden" and "allowed" zones for each of the observed object. These zones may be further changed or adjusted.

The purpose of dividing the space into "allowed" and "forbidden" zones is control and safety. In one embodiment, monitoring system 100 may react if an alarm condition is fulfilled, for example, when monitoring system 100 recognized Moreover, some user-defined rules may augment the procedure of verifying the "abnormal" event of a child approaching a swimming pool. For example, monitoring system 100 may check if there are some other objects (grownups) in the vicinity. Monitoring system 100 recognizes the "forbidden zones" and reacts to the approaching and crossing the borders of these zones. The technique of verifying the alarm condition will be described further in FIG. 6, FIG. 7, FIG. 11.

At step 350, all observed objects are classified by monitoring system 100 as being "known" and "unknown". All people and pets living on this territory, and also the important inanimate objects can be "introduced" to monitoring system 100 by the user, so it would add it to the database of "known" objects 474. The user gives them a name and gives access privileges to the "forbidden" and "allowed" zones.

At step 360, a user may create and augment some rules which may describe the alarm condition. Pre-defined rules represent some description of a situation that may be dangerous. In other words, rules may be described with help of a GUI of user processor-controlled devices that provide grammatical tools in form of main questions such as: "Who is doing something?"; "Where is she/he doing?"; "When is she/he doing?"; and "What is she/he doing?". Monitoring system 100 may already have some rules for alarm conditions. Also, the user may add some types of activities that may be considered as abnormal events.

Figure 6:
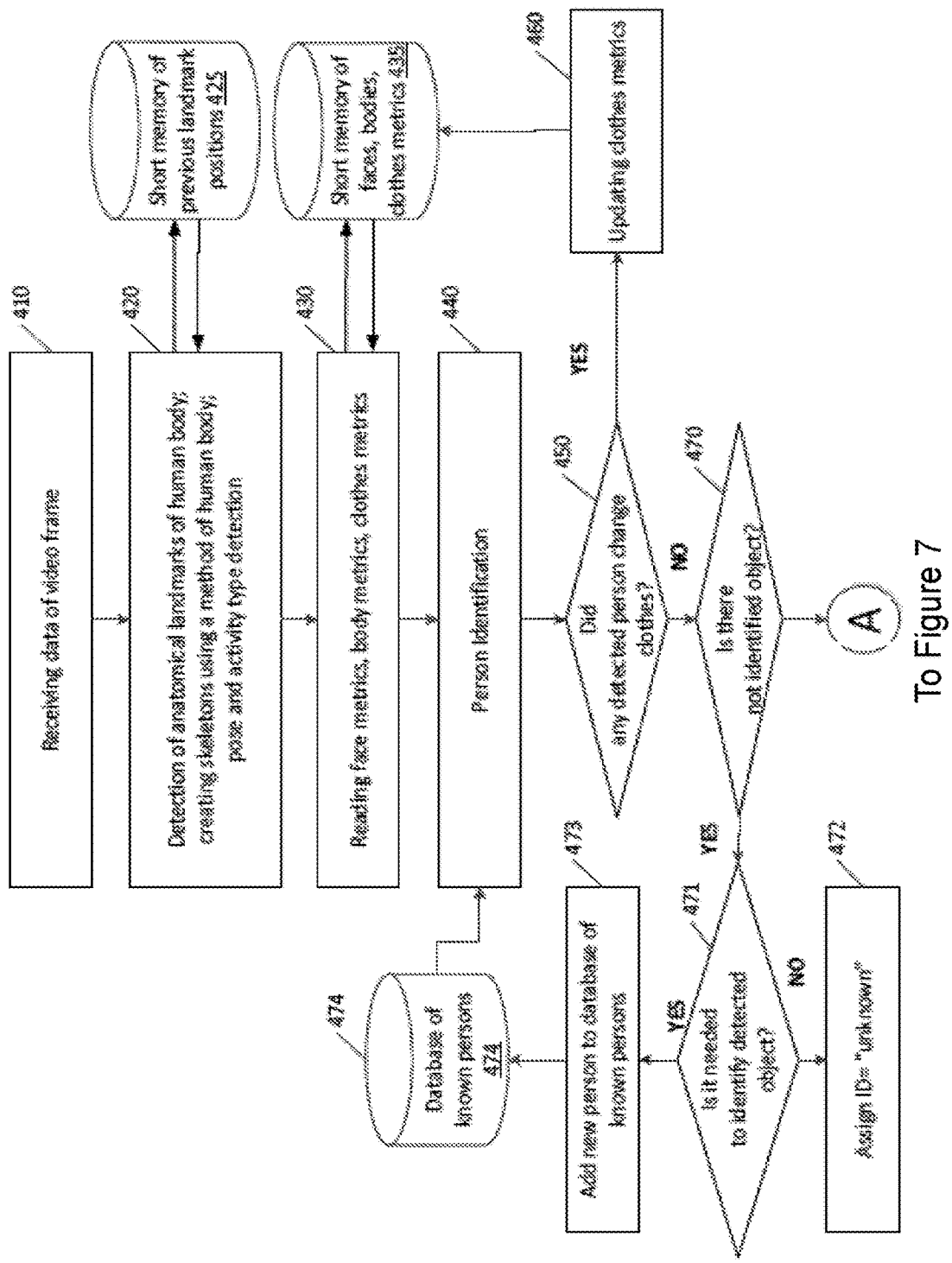
FIG. 6 illustrates an exemplary block diagram representing the monitoring and alarm condition detection.
Figure 7:
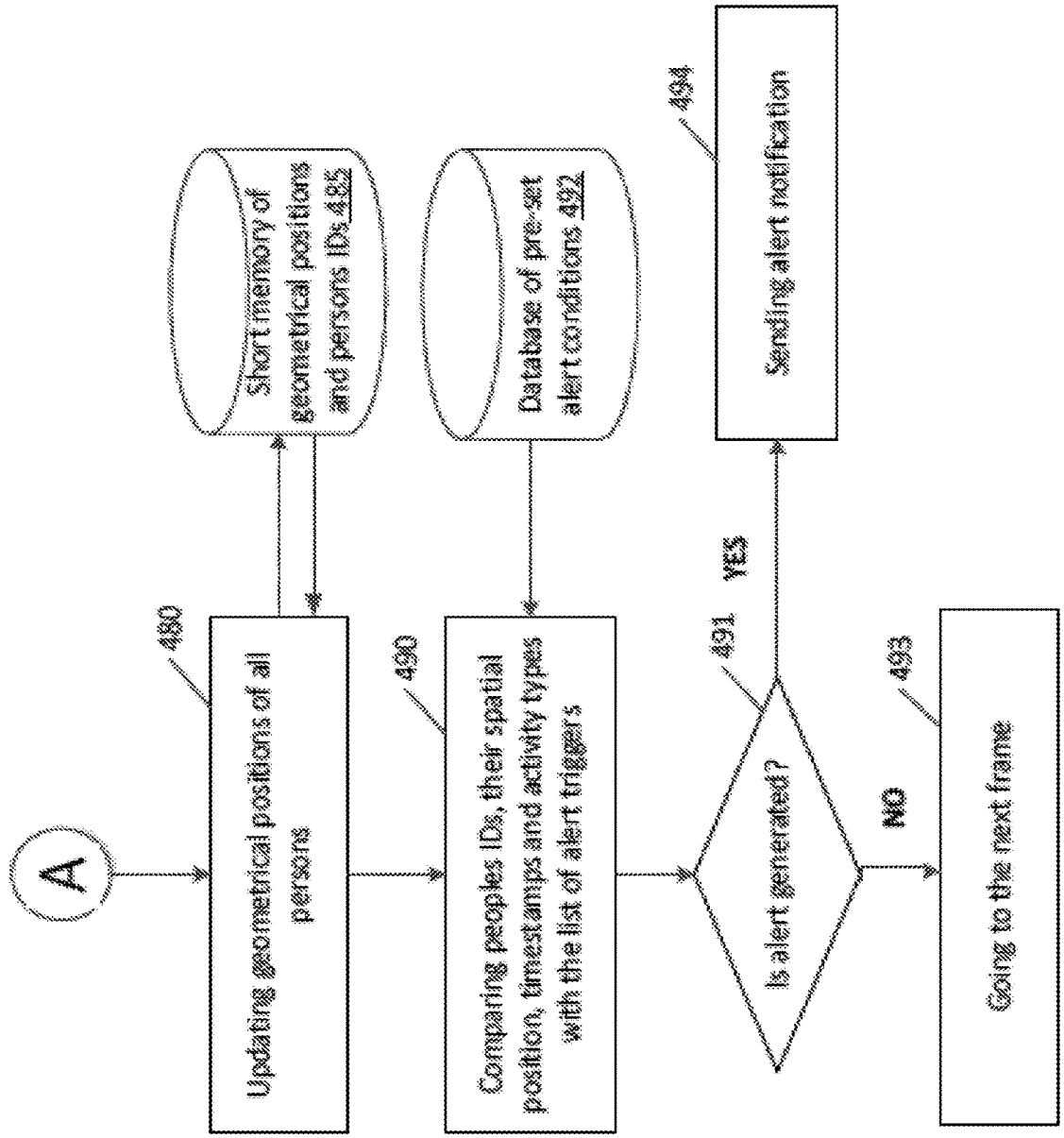
FIG. 7 illustrates an exemplary block diagram representing the monitoring and alarm condition detection.

FIGS. 6 and 7 provide an exemplary block diagram of a computer processing unit 120 operating in accordance with one or more aspects of the present disclosure to verify the alarm condition and send an alert notification to the external system or user processor-controlled devices.

At step 410, the computer processing unit 120 receives data of a video frame from at least one sensor, for example, from a camera viewfinder 200. The frame is being analysed based on the known image processing technique.

At step 420, detection and localizing of anatomical landmarks of a human body on the frame is performed. Anatomical landmarks of a human body may include, for example, a forehead, a chin, a right shoulder, a left shoulder, a right palm, a left palm, a right elbow, a right elbow, a right hip, a left hip, a right knee, a left knee, a right foot, a left foot, and so on. This list is illustrative, as other parts of a human body may be detected. A hierarchy of body parts exist and may be used for verification of a correct detection of an object.

Figure 8:
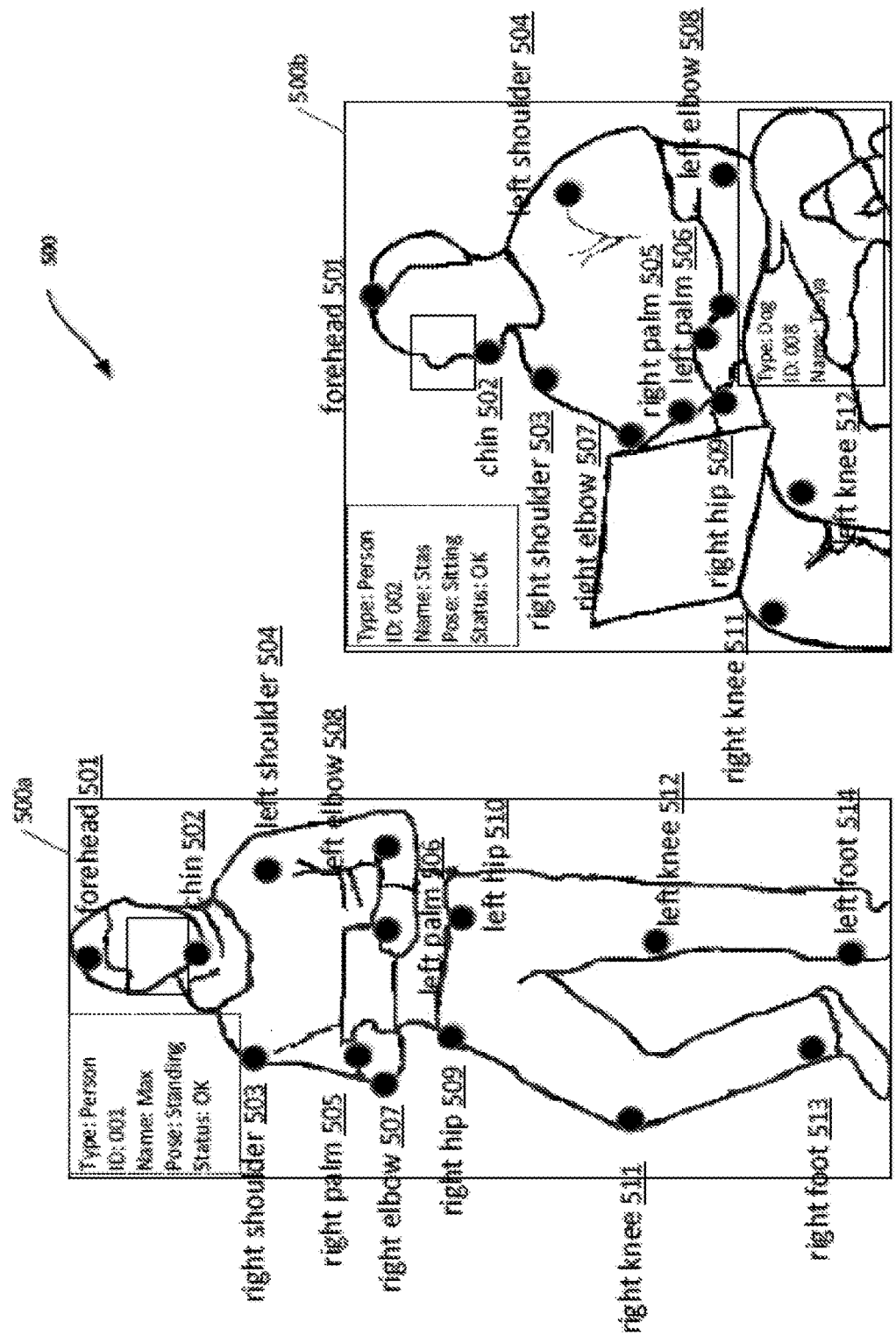
FIG. 8 illustrates an exemplary screen of a user processor-controlled electronic device that contains a frame with identified objects in a viewfinder.

FIG. 8 illustrates schematically an exemplary screen of a user processor controlled electronic device that contains a frame with identified objects in a viewfinder, in according to an implementation. Anatomical landmarks such as a forehead 501, a chin 502, a right shoulder 503, a left shoulder 504, a right palm 505, a left palm 506, a right elbow 507, a left elbow 508, a right hip 509, a left hip 510, a right knee 511, a left knee 512, a right foot 513, a left foot 514, etc. of human bodies are identified within the frame 500. At step 420, monitoring system 100 may interact with a short-term memory storage 425 to extract data about previous landmark positions. The term "previous" may refer to the information extracted from the previously analysed frames.

The identified anatomical landmarks are the basis points to generate a human skeleton and to detect the pose and activity of a human. The human body is identified based on deep learning algorithm of an object recognition. For example, the approach "Real-time Multi-Person 2D Pose Estimation using Part Affinity Fields" of Zhe Cao, Tomas Simon, Shih-En Wei Yaser Sheikh, arXiv:1611.08050, 2016, may be used. Any other algorithms of machine learning such as "Long short-term memory" (recurrent neural network) may also be used here.

Figure 9:
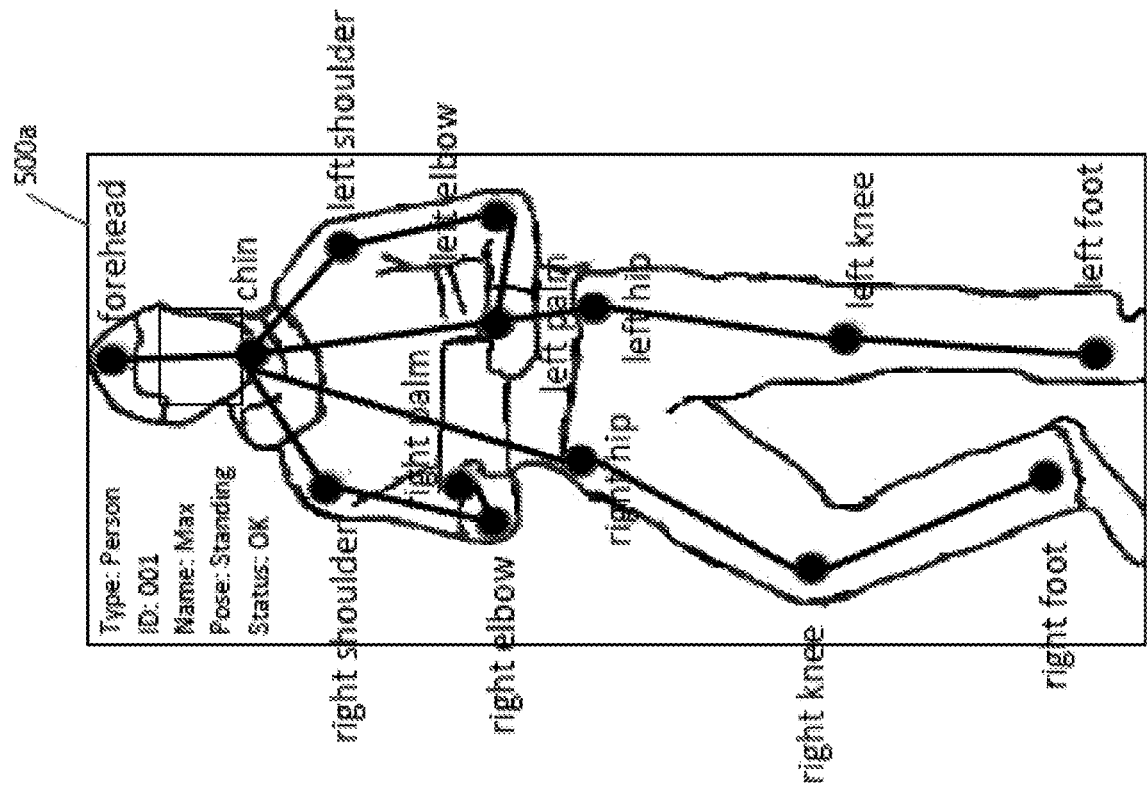
FIG. 9 illustrates an exemplary screen of user processor-controlled electronic device that contains a frame with identified object in a viewfinder.

Referring to FIG. 8, two persons 500a and 500b and a pet are identified within the frame. Each person is included in a describing rectangle that is designed based on the anatomical landmarks of the human body. FIG. 9 illustrates an example user interface of monitoring system 100 in according to an implementation. Namely FIG. 9 illustrates the exemplary results of human skeleton restoring, individual identification, pose detection on a larger scale.

A person can be reliably identified by his/her face or audio timbre. However most of the time the face is not visible to the video cameras. In one of the embodiments, one of the video cameras is directed toward the entrance to the territory, so at least it captures a face of everybody who enters. Once a person is identified by his/her face or audio timbre, all other metrics of this person are measured and updated: his/her today clothes, hairstyle, attached objects such as earrings, rings, bracelets, samples of her lips color, body shape measurements.

Some of such metrics are built into monitoring system 100. However, in one of the embodiments, monitoring system 100 can add new metrics to itself, as it challenges itself and learns automatically over time to recognize better and better "known" people on this territory using even minor clues. For example, after a certain amount of time monitoring system 100 will recognize a person by only a fragment his/her hand, for example.

Some metrics are known to be constant over a long time including, for example, facial features, audio timbre or body shape measurements. The other metrics, such as clothes, are only valid for a short time, as a person can change clothes. However, such "short-time" metrics are extremely robust for short-term tracking. Clothes are often more visible to a camera than a face. Some other metrics can have "medium duration", for example, a hair-style.

Referring to FIG. 6, monitoring system 100 recognizes a detected person as "known" or "unknown". The person may be identified precisely and identification of the person is assigned. FIG. 8 also depicts the main information about the identified object. For example, the type of the object (person or pet), identification, name, pose (standing, sitting) and status.

Referring to FIG. 6 at step 430, reading of face metrics, body metrics, and clothes metrics is performed. Monitoring system 100 recognizes the biometric parameters of humans within the frame of video stream. Monitoring system 100 may use the identification based on the shape of the body of a human, haircut or clothes. This type of identification is not reliable but may be used at one of the level of identification. Behavioral characteristics are related to the pattern of behavior of a person, including but not limited to typing rhythm, gait, and voice. In one embodiment, the person may be identified based on the timbre of voice. The voice may be not recorded because of privacy. Monitoring system 100 tracks the sound intensity and the spectral characteristics of the sound. Behavioural characteristics are stored in the memory of monitoring system 100 and analysed.

Monitoring system 100 may know what behaviour, type and time of activities is typical for a specific object. At step 430, monitoring system 100 may interact with a short-term memory storage 435 faces, bodies, clothes metrics which contain the information about detected faces, bodies, clothes metrics detected at the previous frame.

At step 440, person identification is performed based on the information assembled from previous steps and extracted from the database of known person 474.

Moreover, monitoring system 100 allows for identification of a "known" person who just changed clothes. At step 450, monitoring system 100 verifies whether any detected person has changed clothes. If somebody has changed clothes, monitoring system 100 goes to step 460 to update the clothes metrics data and to add it to the short-term memory of faces, bodies, and clothes metrics 435.

If nobody within the frame has changed clothes, monitoring system 100 checks at step 470 whether all persons are identified. If there are not identified objects, monitoring system 100 checks 471 whether it is needed to uniquely identify the person or not. For example, monitoring system 100 may send a request to user to add 473 a new "unknown" person to the database of "known" persons 474. The use may approve the request and give information (name, age, etc.) about detected objects which may be further used in a person identification procedure. If it is not necessary to identify the person, monitoring system 100 assigns ID="unknown" at step 472. In case of an emergency situation (alarm condition), the biometrical date of this unknown person is transferred to the external services, for example, to the policy.

FIG. 7 illustrates the continuation of FIG. 6. At step 480 monitoring system 100 updates the geometrical (spatial) positions of all objects based on the information from the short-term memory of geometrical positions and personal IDs 485.

At step 490 monitoring system 100 compares people's IDs, their spatial position, timestamps and activity types with the list of alert triggers. Database of pre-set alert conditions 492 may be used here. The database of pre-set alert/alarm conditions 492 may include descriptions of specific objects, such a blood or weapons. If an alert is generated at step 491, monitoring system 100 may send alert notification 494 to the external system or devices and user-controlled devices.

If an alert is not generated at step 491, monitoring system 100 continues 493 to process data from the next frame. Techniques for improvements of identification may be used to increase the accuracy of monitoring system 100. For example, such techniques may be used to track a person sitting or staying with their back to the camera, moving from one room to another room, changing clothes or hidden behind furniture. Techniques for tracking a person may be augmented using audio data from microphones. Techniques for tracking a person augmented when an identified object disappears from one camera viewfinder and does not appear in another camera viewfinder and system are important to prevent losing track of such an identified object. When the location of a person is known, it is correlated with the signal from microphones. Then monitoring system 100 may restore the coordinated of a person based only on the signals from the microphones.

The proposed monitoring system 100 is able to identify animals, for example, cats, dogs, etc. Identification of pets is needed for further video frame decomposition and analysis. For example, monitoring system 100 does not react to the motion of pets, when the house is temporally left by the owners. On other hand when a pet bites bite a child, monitoring system 100 reacts and call an alert or makes contacts with a designated adult in closest vicinity to the child. Such a rule describing this dangerous situation may be added by the user into monitoring system 100.

Figure 10:
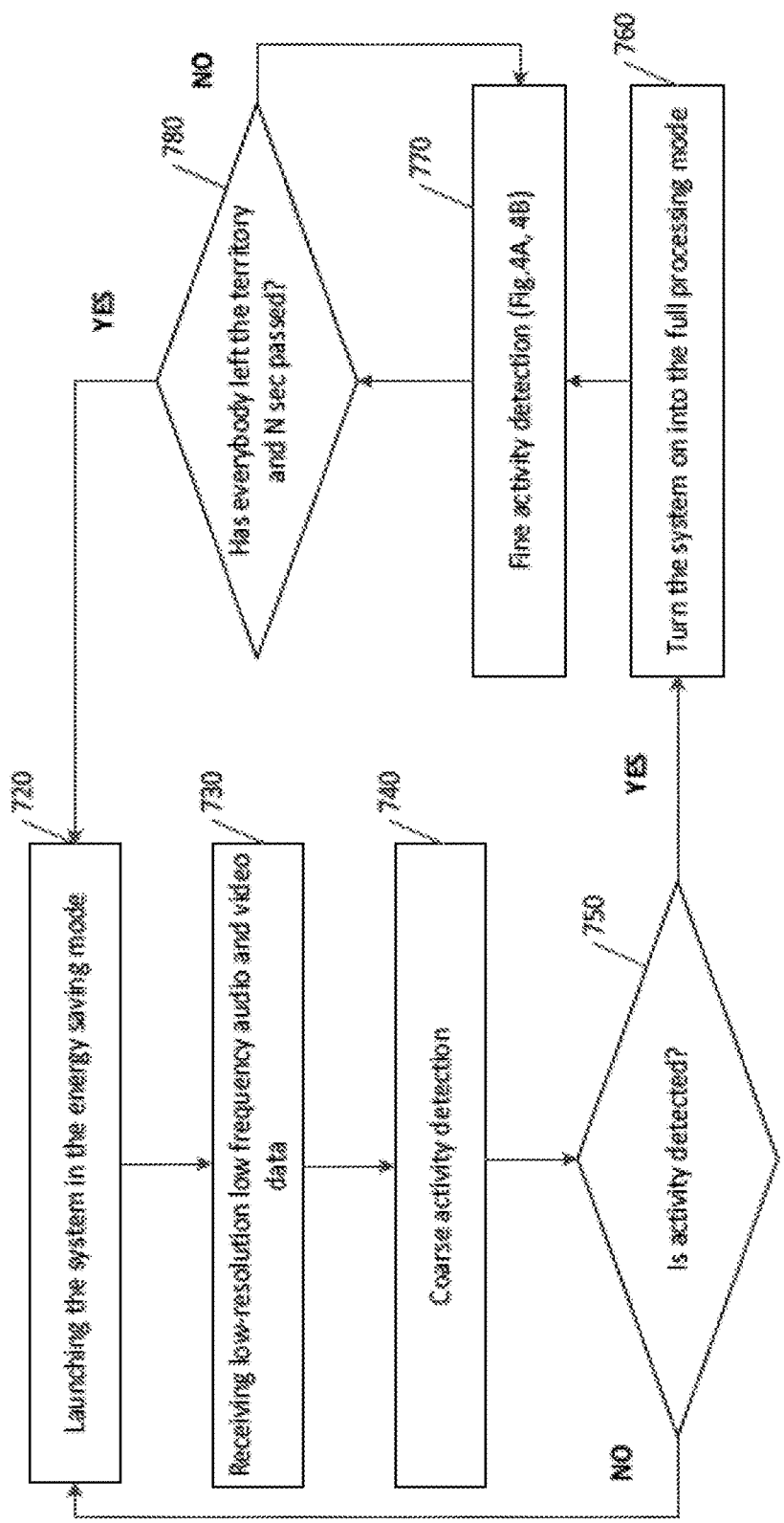
FIG. 10 illustrates an exemplary block diagram of a system operation in different modes.

The described monitoring system 100 is adaptive. It means that monitoring system 100 may work in different modes to save energy and resources. FIG. 10 illustrates an exemplary block diagram of the running monitoring system 100 in several modes according to an implementation. At step 720, monitoring system 100 is launched. Most of the time monitoring system 100 works in an energy saving mode. At step 730, monitoring system 100 receives signals from sensors 100, namely low-resolution low frequency audio and video data. At step 740, monitoring system 100 detects only a few categories of the objects and their coarse activity. If activity is not detected in step 750 within the frame, monitoring system 100 returns to the step 720.

If activity is detected in step, 750 monitoring system 100 turns on into a full processing mode 760 to detect in step 770 the type of activity precisely as was described above in according to FIGS. 6 and 7. Monitoring system 100 may verify some conditions as in step 780, for example, whether every object has left the territory and N seconds passed. If these conditions are not fulfilled monitoring system 100 returns to step 720.

Figure 11:
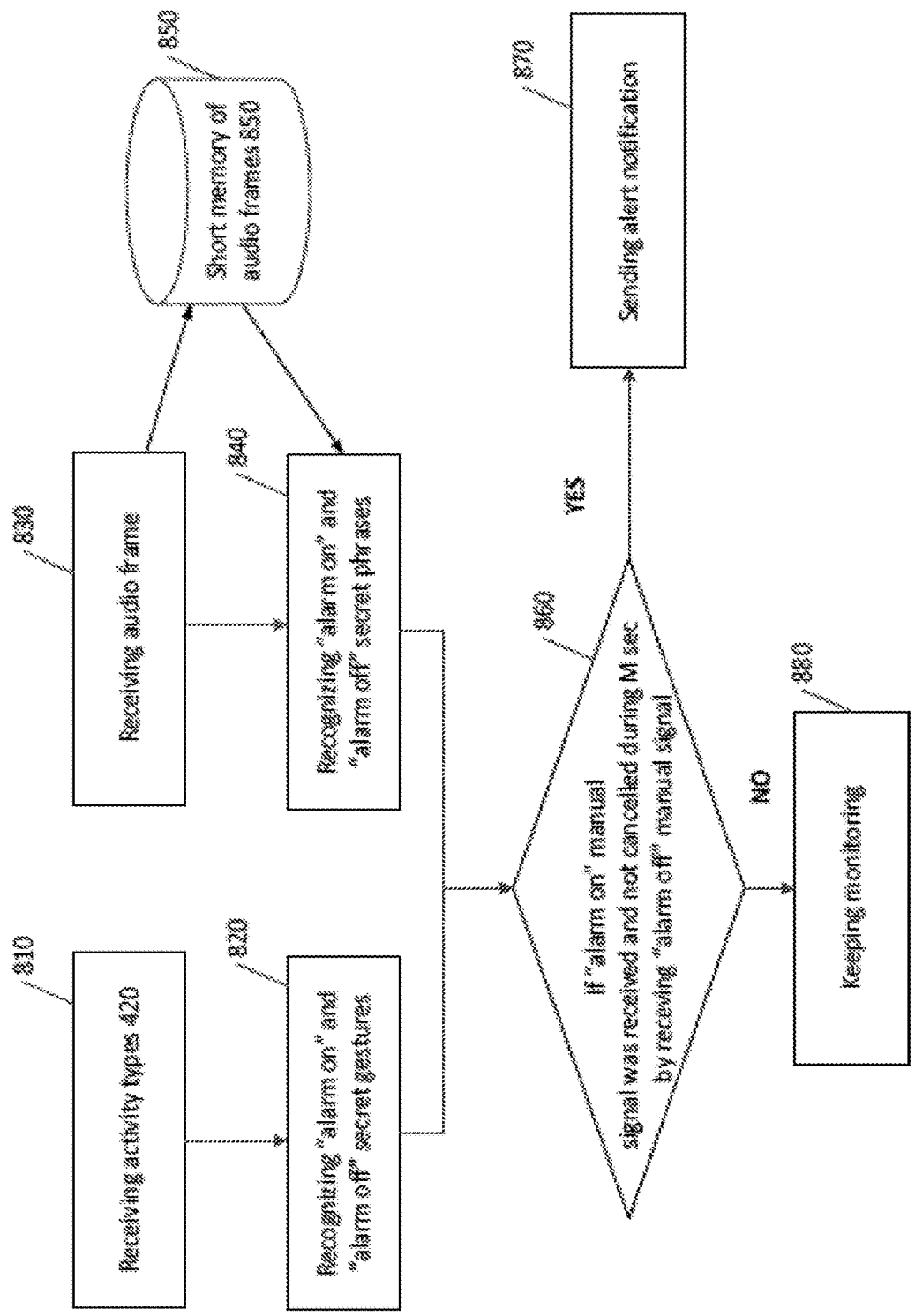
FIG. 11 illustrates an exemplary block diagram of a system operation in case of a secret signal detection.

The described monitoring system 100 is able to recognize preliminary defined alarm signals, such as for example, a gesture, a spoken phrase, or an audio signal to increase the accuracy in preventing of dangerous events. The alarm signal is needed in the case when monitoring system 100 is not able to recognize the problem automatically, requiring a person to signal to about the problem. FIG. 11 illustrates an exemplary block diagram to detect the alarm signal and send alarm notification to external services or user processor-controlled devices in according to an implementation.

At step 810, monitoring system 100 receives a description of types of activity detected earlier. The flowchart in FIG. 11 provides more detail. At step 820, recognition of "alarm on" and "alarm off" secret gestures is performed. For example, secret gestures are included in monitoring system 100 during the calibration stage of monitoring system 100. Secret gestures are purposed to notify monitoring system 100 about an abnormal event. Secret gestures may trigger the alarm notification sending ("alarm on" secret gestures) or stop monitoring system 100 ("alarm off" secret gestures) from performing an action based on a false triggering. In one of the embodiments, monitoring system 100 may have a pre-set list of pre-trained visual and audial alarm on/off gestures or phrases, such as known to be particularly easy for recognition by monitoring system 100. The user then would choose one or a few from this list.

Moreover, monitoring system 100 is able to recognize secret audio signals. So, at step 830 monitoring system 100 may receive audio frames. At step 840, recognition of "alarm on" and "alarm off" secret phrases is performed. For example, short memory 850 of audio frames is used for this purpose.

At step 860, it is verified whether an "alarm on" manual signal was received and not cancelled during M sec by receiving an "alarm off" manual signal. If these conditions are not fulfilled, in step 880 monitoring system 100 continues monitoring by going to the next frame and keeping tracking of detected objects. If these conditions are fulfilled monitoring system 100 sends alert notification at step 870.

The high-level interface providing information about the observed territory in an informative and compact way is now described. The proposed representation technique doesn't require the user to watch the video and hear the audio in order to understand what people do in some area under surveillance.

The proposed representation technique allows the user to receive a precise overview of the observed territory in just a few seconds. As a result, aspects of the present disclosure allow an increase to the speed of the tracking process and to reduce the cognitive load on the user. Moreover, aspects of the present disclosure enable the user to review data and pick any moment of time in the past to analyse the situation in the past. The system suggests tracks to show the spatial location of the objects in the past. It helps to check the situation on the territory not only during the current moment but also in the past, without picking an exact moment of time.

Figure 12:
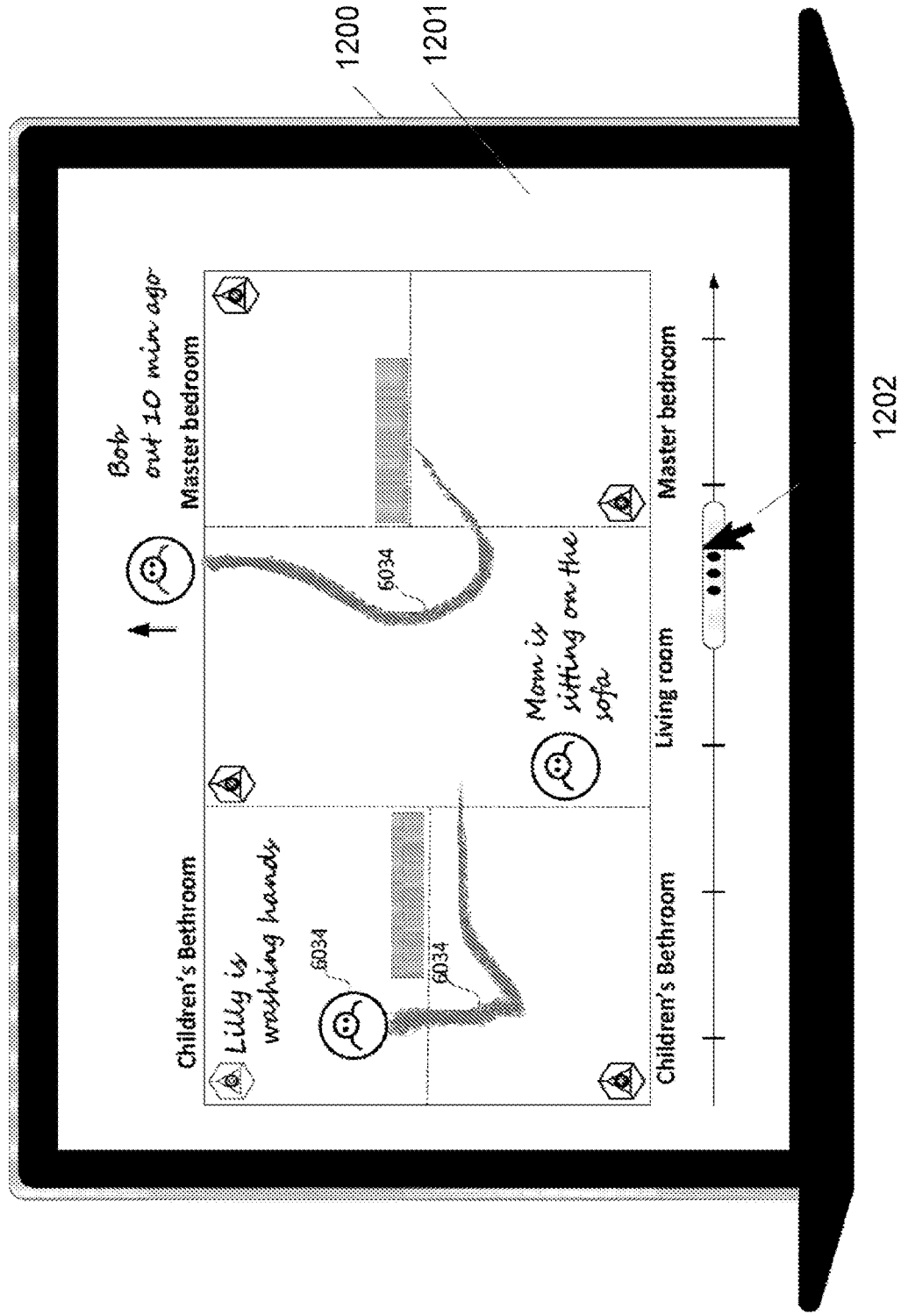
FIG. 12 illustrates an exemplary user processor-controlled device with the user interface of a dashboard on the screen operating.

FIG. 12 illustrates an exemplary user processor-controlled device 1200 operating in accordance with one aspect of the present invention. In illustrative examples, user processor controlled device may be represented by any electronic device, including a laptop computer, a personal computer, a smart phone, a tablet computer, etc. A user processor controlled device may comprise a processor, memory storage, display 1201, keyboard, input device, etc. The user processor-controlled device may include touch screen input units that may be represented by the touch-input sensitive area. An exemplary graphical user interface with the mini map on the screen of a user processor-controlled device 1200 is represented.

In one embodiment processed data from sensors of a monitoring system may be represented on a dashboard, wherein users can track a position of surveillance object. In one embodiment processed by computer processing unit 120 data may be extracted from the memory storage 130 to be represented in visual form on the display of a user processor-controlled device 150.

Figure 13:
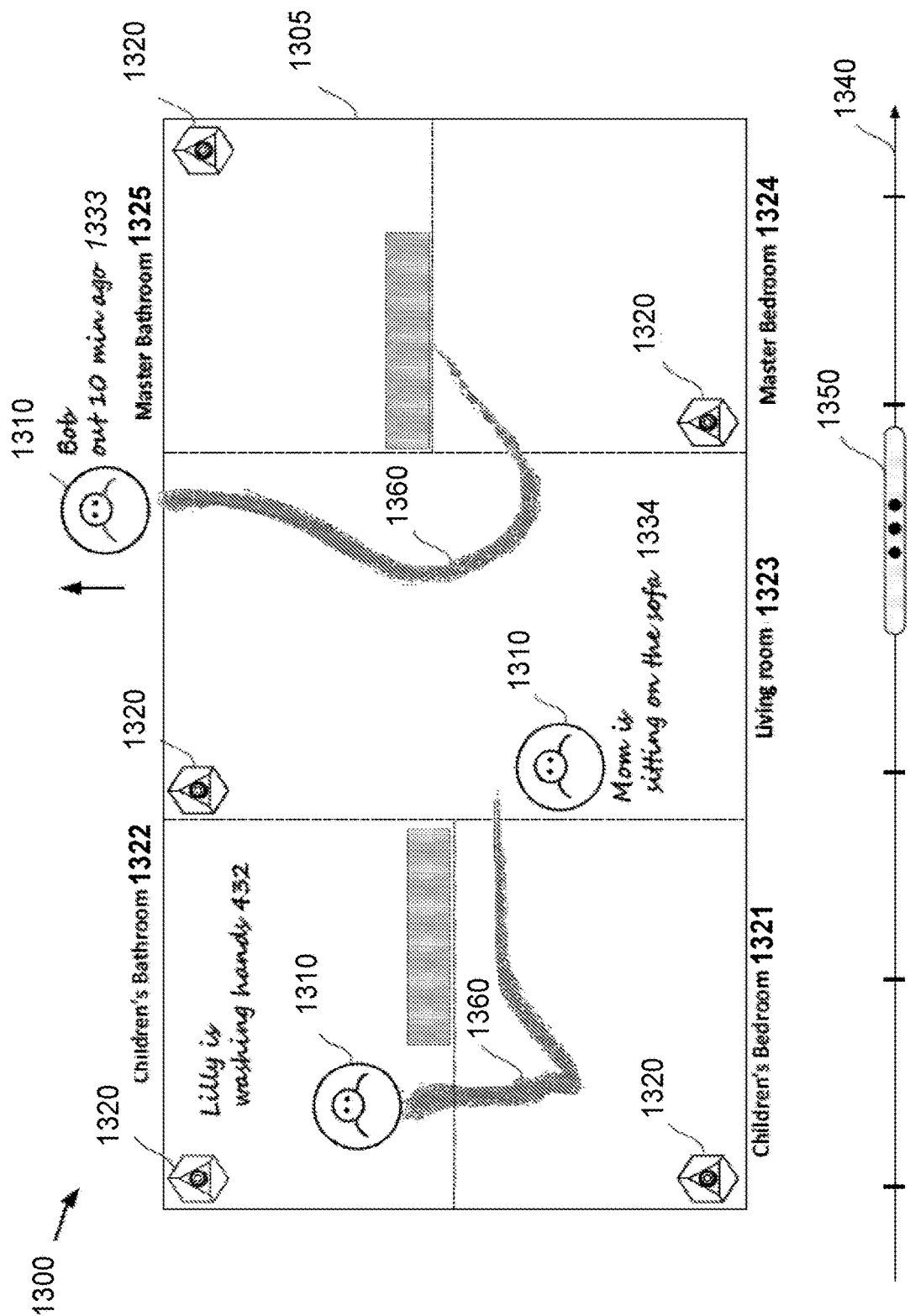
FIG. 13 illustrates an exemplary graphical user interface of a dashboard with the mini 2 map and a timeline with a slider on the screen of a user processor-controlled device.

FIG. 13 illustrates an exemplary graphical user interface of a dashboard 1300 with a mini map 405 and a timeline 1340 with a slider 1350 on the screen of a user processor controlled device 150. A dashboard 1300 comprises a customizable screen that compactly and visually displays vital information on different aspects of the system. The dashboard 1300 collects and represents the most important information, more particularly information about all observed objects, their activity, and their allocation within the territory.

For example, dashboard may comprise a mini map (or generated plan) 1305. Mini map 1305 (or in other words, plan of the territory) may be generated by the security system 105 based on the identified geometrical parameters. Generating of the territory mini map may be performed in the semi-automatic way based on the data from the sensors 110.

For example, information about an angle of a camera from the gyroscope is able to define the plan of the territory more precisely. In one embodiment, the system creates the description of the preliminary plan and the user may correct the results of the created plan at step 330 (FIG. 5) to increase the accuracy of identified parameters of the territory. In another embodiment, the system creates the description of the living space in an automatic way without operator assistance.

Referring to the FIG. 13, the GUI interface represents an exemplary dashboard 1300 with a generated mini map 1300 of the territory, wherein the information about observed objects is indicated in a specific moment of time. Designed plan 405 may include all available information about the territory, namely the allocation of rooms, their geometrical sizes, windows, doors, stairs, source of light, the type of room, etc. In other words, the generated plan depicts the graphical image of the territory and it is created to schematically represent to the user the received and processed data from the sensors of the monitoring system. For example, the information for multiple floors of the observed territory, the interface may connect multiple mini-maps to each other.

Dashboard 1305 represents a customized screen on a user-processor controlled device 150, wherein Graphical User Interface (GUI) 160 provides a user with the possibility to change the settings of the application.

For example, GUI 160 allows the user to define the view mode of a mini map. The term "view mode" may refer herein to the way a mini map is represented to a user on a display. In one embodiment, the mini map of the territory may be displayed on the screen of user processor-controlled device 150 as a schematic picture or drawing of the territory from above. One of the main features of the present technique is representing the information in a form of schematic drawing or cartoon. The existing security, monitoring and control system show all complete information on the screen of a display of a user processor-controlled device thereby increasing the cognitive load on the user and decreasing the speed of the tracking process. The schematic graphical image representation of data from sensors allows the system to show only the most important details, that help focus attention of a user on the most important information and reduce the time of the tracking process.

In another embodiment, the mini map of the territory may be displayed from any specific angle, creating for a user a sense of a presence. The user may move within the mini map to make an overview of the situation on the territory to be observed.

The described invention enables the user to add new details on the dashboard that should be represented on the screen of a user processor-controlled device 150. The degree of detailing may be changed in the settings of the application. In one exemplary embodiment, the mini map may include only the plan of the territory with an indication of the allocation of rooms, the titles of room (such as "children's bedroom" 1321, "children's bathroom" 1322, "living room" 423, "master bedroom" 1324, "master bathroom" 1325) etc. In another exemplary embodiment, the mini map may include the allocation of doors and windows, furniture or other objects, such as fireplace, swimming pool, baths, etc.

The mini map 1300 may comprise the information about the location of cameras 420, microphones and additional sensors.

The observed object may be indicated on the mini map 400. In comparison to the existing technique the observed objects within the mini map may be represented by the means of avatars 1320 and schematic figures. Avatar may be chosen by default or changed by user of the system. This type of objects representation provides the privacy of information about personal life of a user of the given system.

Moreover, a dashboard 1300 may comprise a timeline 1340 with a slider 1350 that enable the user to choose a moment of time at the time line 1340. The user can pick any time in the past to check the situation in the past. By scrolling the slider 1350, a user initiates the dynamic change of graphical image representation of the information within the mini map. The term "dynamic" means the change of the information (objects, their activity, their allocation) during the time. The user may overview the information by scrolling the slider by means of touch input or cursor 1202 in a short period of time, providing the considerable speeding-up of information provision. In a conventional system the user requires to view all video data.

Moreover, the current user interface may comprise a track 1350 to show the spatial location of the object in the past. The term "track" may refer to the trace of the object that is identified based on geometrical parameters of the object. Representation of track 460 within the mini map 1305 gives the visual information about the allocation and the movement of the objects during the time within the territory. Time period for track representation may be installed by default, for example during 30 minutes, or this may be changed by user.

The track may be represented on the mini map in different ways. For example, a track 1360 may be painted as a curve line with a color of different intensity. The intensity of coloring may show the speed of the movement of the object within the territory. The high intensity of coloring may indicate on the high velocity of the movement. The low intensity of coloring may indicate the low velocity of movement.

The mini map 1305 may provide short and precise information about the detected activity of the objects. For example, GUI may give some notes about the activities, such as "Lilly is washing hands" 1332, "Mum is sitting on the sofa" 1334, and "Bob went out 10 min ago" 1333, etc.

In one embodiment the user may indicate, for example by touch, the object and receive the precise and short information about the specific object. For example, in response to user selection of one the Lilly avatar 1320 the system may provide the full information about the activity of Lilly during the day. For example, the textual report may include textual information about the main events. For example, "Lilly woke up at 9 am, went to the kitchen, had a breakfast with nurse, spent 2 hours in the study room, spent one hour nearby the swimming pool,", "Mom cooked breakfast at 8.30 am, cleaned the rooms, spent 2 hours with Lilly in children bedroom . . . ", "Bob took medicine at 8 am, read book 3 hours, left a house at 1 pm . . . " etc. Any text-to-speech techniques may be used here to reproduce events during the requested time period.

Figure 14:
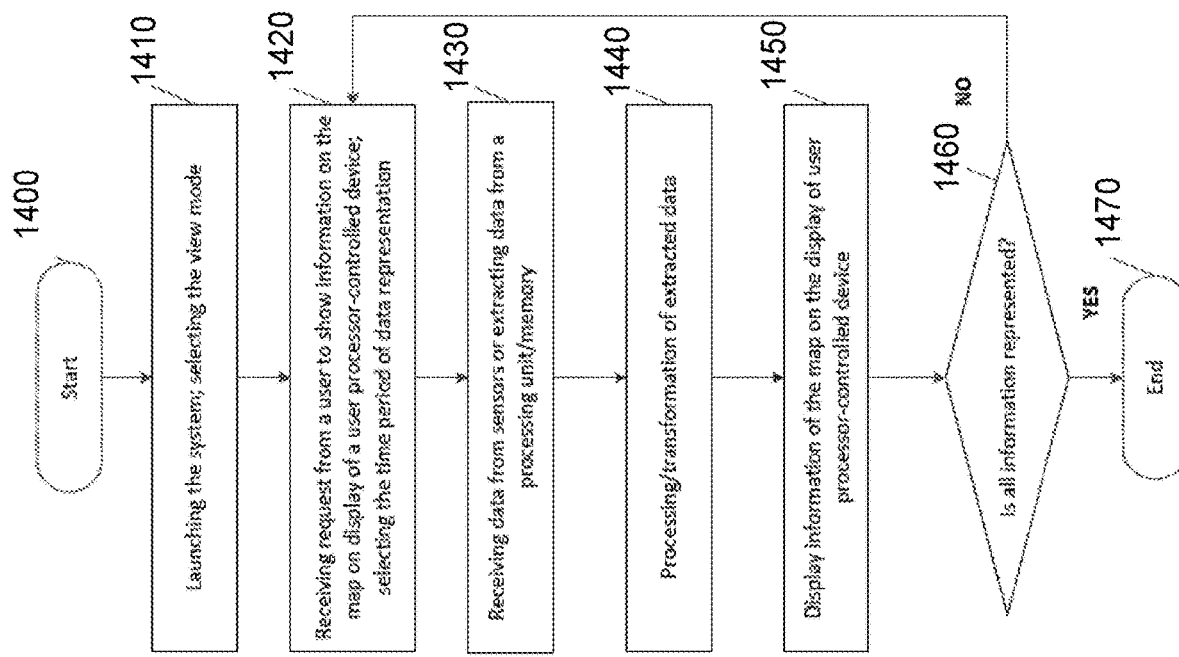
FIG. 14 illustrates an exemplary block diagram of a user interaction with the system.

FIG. 14 illustrates an exemplary block diagram of an interacting of user with the graphical interface of the system in accordance with one aspect of the invention. The method of an interacting of a user with the graphical interface of the system 100 starts at step 1400 and proceeds to step 1470.

At step 1410 a user launches the system application window and may select the view mode. Then at step 1420 a user may send a request to show the information about the observed territory on the mini map on a dashboard 1300 on the display of a user processor controlled device. Also, the user may select the time period of data representation by means of time line 1340 with slider 1350. The user may use input devices, such as an optical mouse or touch screen display, to indicate the time moment on the time line.

When launched, the application may respond to the input of a user received from sensors of a security and monitoring system 105. In one embodiment processed by computer processing unit 120 data may be extracted from the memory storage 130 to be represented in visual form on the display of a user processor-controlled device 150.

The identified objects, their positions and the identified activity are displayed on the mini map at step 1450 of a dashboard 1305. If not all information is represented then the user may request additional information at step 1420, for example the user indicates the specific time moment with the slider 1350 on the timeline 1340. Otherwise the user may monitor the territory or close the system application window.

Figure 15:
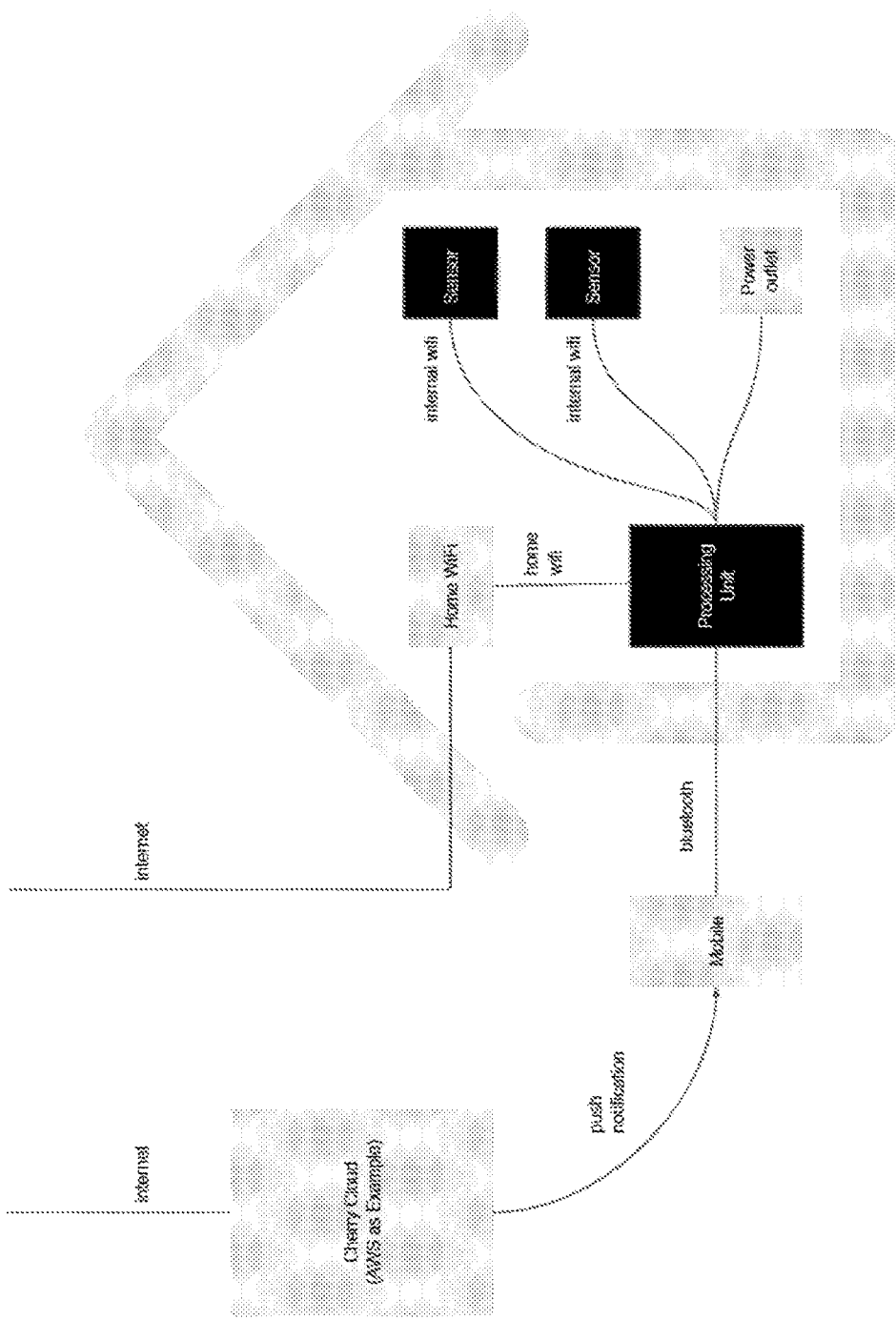
FIG. 15 illustrates a further example of a home monitoring and security system.

FIG. 15 provides a further example with a drawing of a home monitoring and security surveillance system integrated within a home environment. The system includes a processing unit connected to a set of sensors and provides intelligent home monitoring with a function of notification and emergency calling.

Figure 16:
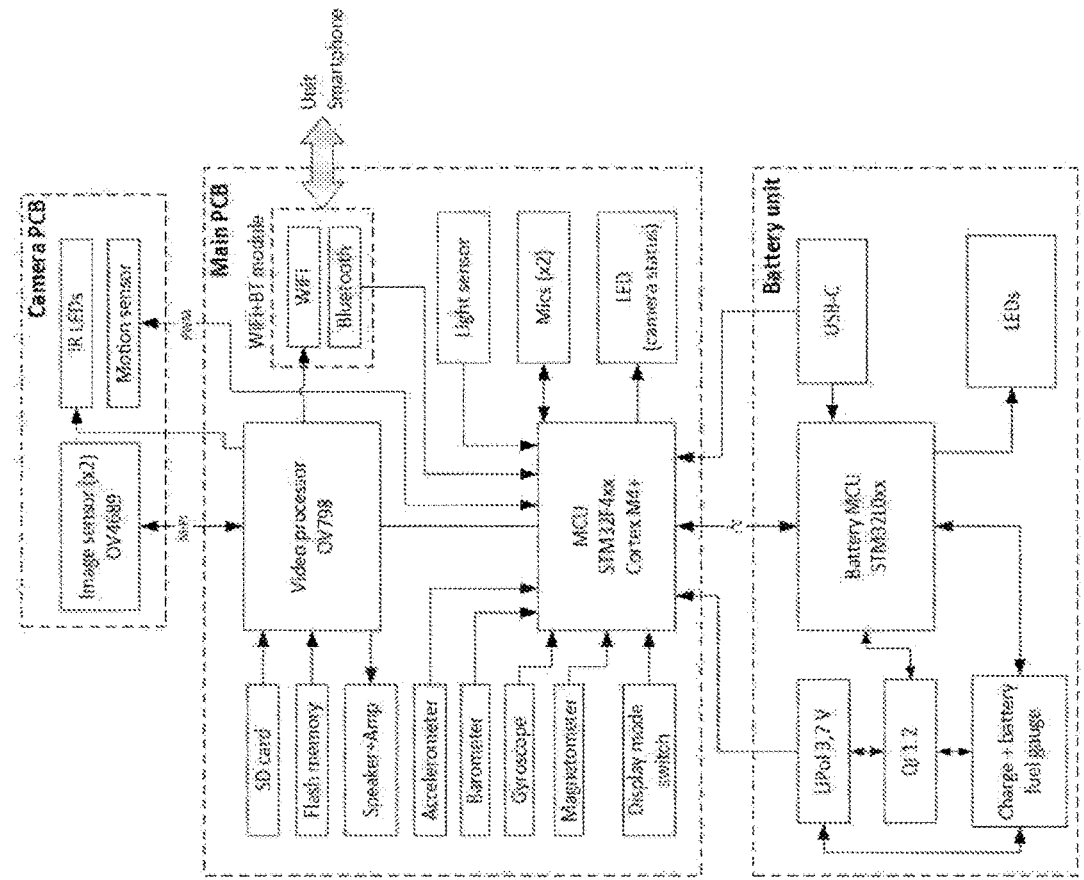
FIG. 16 illustrates the main components of a sensor node including a single Camera.

FIG. 16 shows an example of the main components of a sensor node with a single camera, called the CherryCam, which provides sensor and video/audio data streams via a Wi-Fi/Bluetooth connection to the processing unit inside the house and acts according to software requirements. It comprises 3 main components:
  Main PCB;
  Camera PCB;
  Battery (removable and rechargeable).

Figure 17:
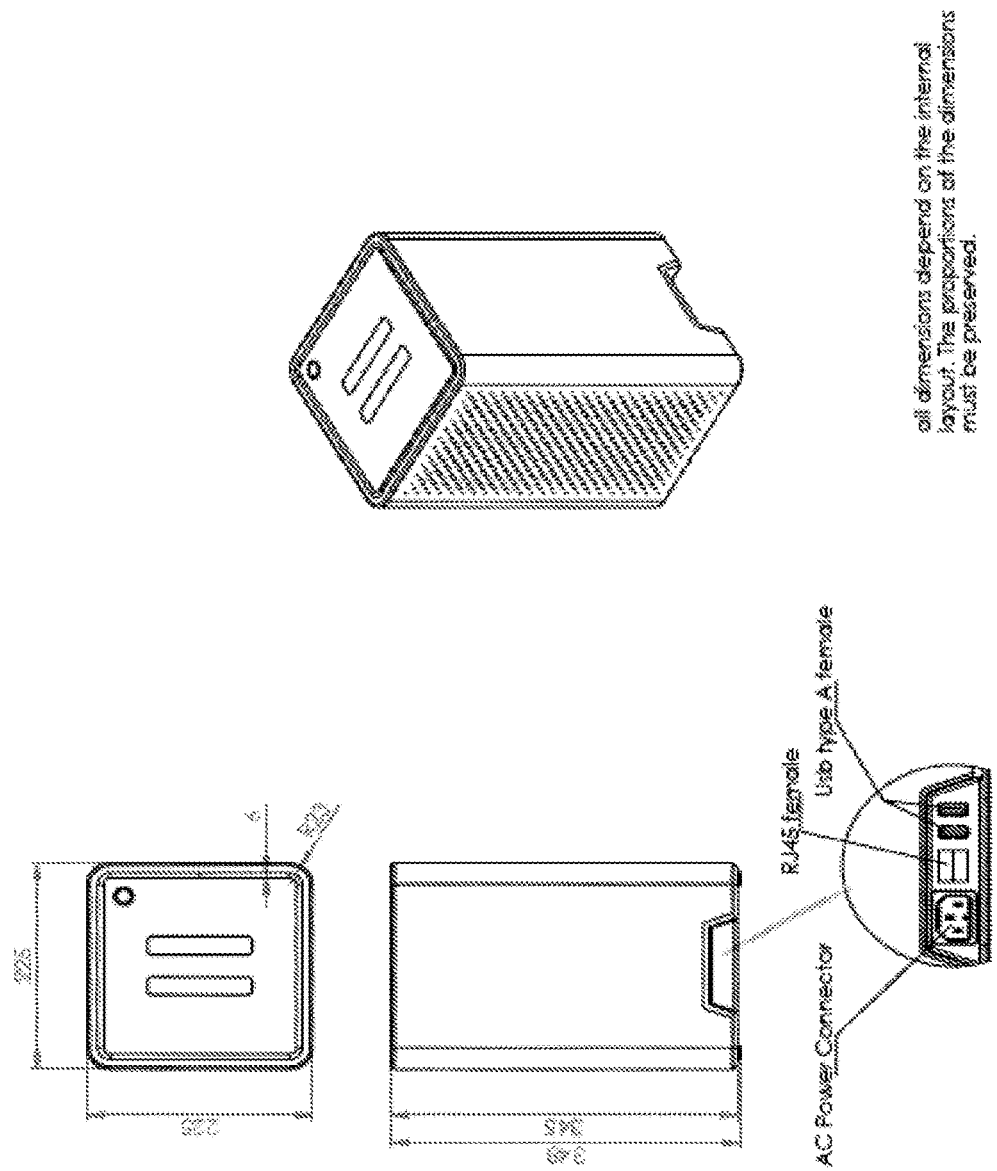
FIG. 17 illustrates an exemplary sensor node.
Figure 18:
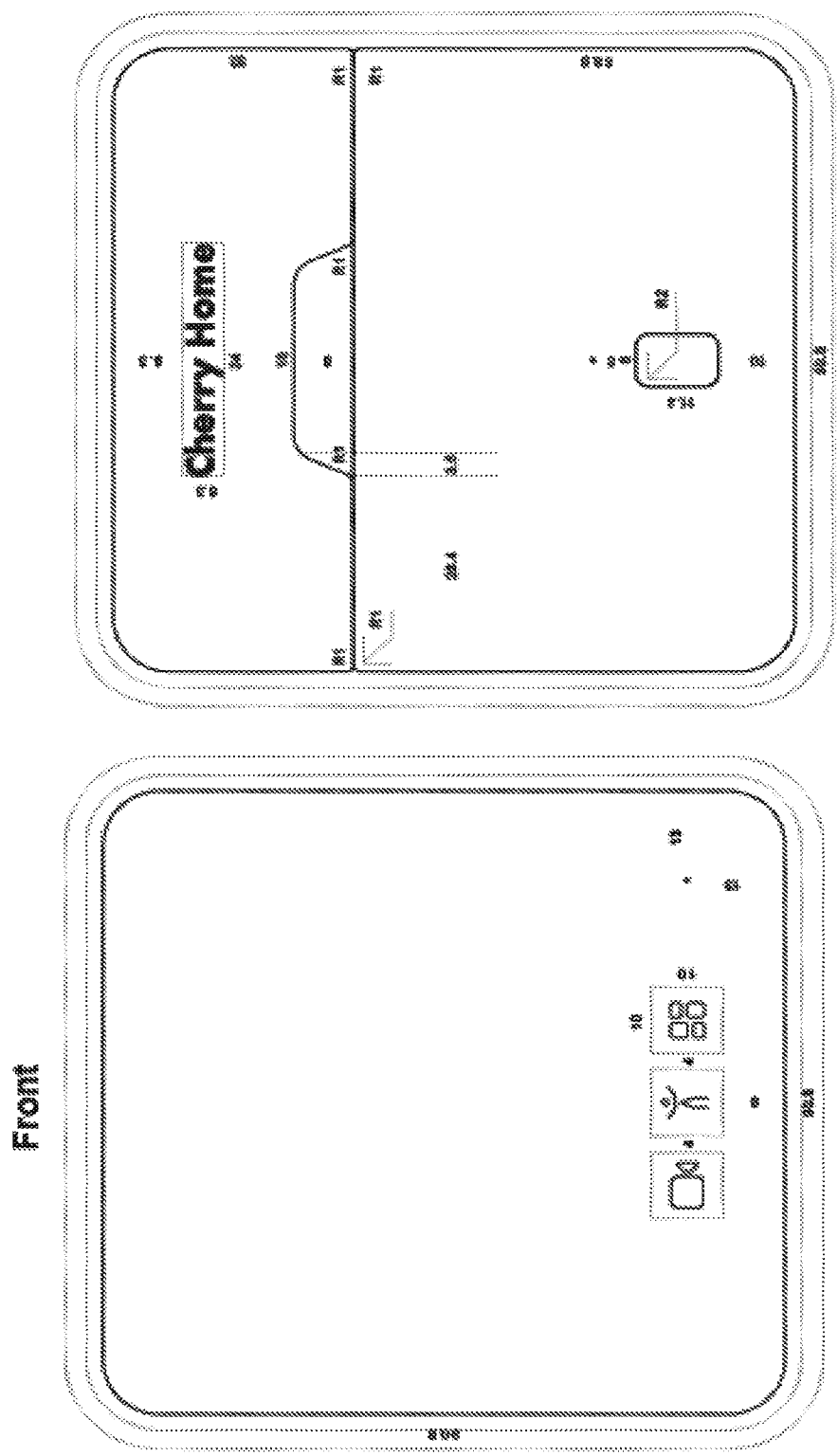
FIG. 18 illustrates an exemplary sensor node.

FIGS. 17 and 18 show examples of the CherryCam design.

The main PCB includes:
a. Low power 32-bit microcontroller STM32 F4-series;
b. Video processor OV798;
c. Barometer;
d. Accelerometer;
e. Gyroscope;
f. Magnetometer;
g. 2×MEMS microphones;
h. Light sensor;
i. LED indicator;
j. Flash memory;
k. WiFi, Bluetooth 4.0, and FM RX module;
l. Micro-SD socket;
m. Speaker and audio amplifier;
n. Display mode switch.

The camera PCB includes:
a. 2×CMOS RGB image sensors OV4689: with permanent IR-filter
b. Infra-red LEDs;
c. Motion sensor (PIR).

The removable battery includes (exceeding 3500 mAh)
a. Microcontroller STM32 L0-series;
b. USB-C port;
c. Charge & battery fuel gauge;
d. LED indicators;
e. Li-Pol 3.7V battery;
f. QI 1.2 charge module.

Examples of usage scenarios are now described.
Connection of processing unit to home Wi-Fi network:
1. Connecting unit to the power supply. LED indicator starts to blink in white.
2. Installing application on mobile phone. Signing up and creating account if necessary.
3. Application searches unit and performs connection via Bluetooth.
4. User inputs required data via application: selects Wi-Fi network and enters the key.
5. If connection was successful LED indicator stops blinking and starts to glow in white.
6. If Ethernet-cable is used—no input data required.

Connection to the processing unit:
1. Inserting battery in CherryCam. LED indicator starts to blink in white, sound signal occurs.
2. Direct connection via Bluetooth (close range):
   a. In the case Cherrycam is close to the unit, connection can be established directly via Bluetooth.
   b. Camera detects unit via Bluetooth, connects, and obtains internal Wi-Fi parameters from unit.
3. Connection via phone application (distant range):
   a. In the case Cherrycam is far from unit, connection can be established indirectly using phone application.
   b. Phone detects camera via Bluetooth and establishes connection.
   c. Phone establishes connection with unit via Wi-Fi, obtains internal Wi-Fi parameters and transmits them to CherryCam via Bluetooth.
4. If connection was successful LED indicator stops blinking and starts to glow in white for approx. 20 seconds and then turns off.

A standby state or mode is available. The following events may activate the standby state:
default state of CherryCam after connection to the unit.
if no movement/noise detected by corresponding sensors, timeout starts. On the expiration of timeout standby state is initiated;
processing unit request via Wi-Fi/Bluetooth.

In standby state, the motion sensor, microphone set and Bluetooth are active. Other components are in sleep mode. "keep alive" signals are also sent to the processing unit via Wi-Fi/Bluetooth at regular intervals.

Other states or modes are available such as, but not limited to:
Single, 480p and day mode:
Single, 480p and night mode;
Single, 720p and day mode;
Single, 720p and night mode;
Single, 1080p and night mode;
Stereo, 480p and day mode:
Stereo, 480p and night mode;
Stereo, 720p and day mode;
Stereo, 720p and night mode;
Stereo, 1080p and night mode;

As an example, 'single, 480p and day mode' may have the following parameters:
Examples of events which may activate the state are:
Motion sensor trigger in case of any motion detected within the sensors' range;
Microphone set trigger: in case of any noise above threshold is detected by microphone set;
Processing unit trigger: activation is performed by the processing unit signal via Bluetooth/Wi-Fi.
light sensor command;
processing unit request.
Operation: transferring video/audio streams, sensor data via Wi-Fi/Bluetooth to the processing unit, and 4MP still-shot on the processing unit request. When there is a 4MP still-shot request, camera is switched to corresponding single mode (for approximately 1 second), takes still-shot and returns to currentmode.

As an example, 'single, 480p and night mode' may have the following parameters:
Examples of events which may activate the state are:
Motion sensor trigger in case of any motion detected within the sensors' range;
Microphone set trigger: in case of any noise above threshold is detected by microphone set;
Processing unit trigger: activation is performed by the processing unit signal via Bluetooth/Wi-Fi.
light sensor command;
processing unit request.
Operation: transferring video/audio streams, sensor data via WiFi/Bluetooth to the processing unit.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:
1. A monitoring system comprising:
one or more sensors configured to generate signals to monitor activity within a designated territory, the sensors including visual sensors that make video recordings;

a local processing system located within or proximate to the designated territory, the local processing system is configured to
  receive the signals from the sensors;
  process and analyze the signals from the sensors to recognize one or more activities or metrics;
  learn automatically over time from the recognized activities to include new metrics into consideration and to identify one or more abnormal events and/or the person associated with the abnormal events within the designated territory;
  produce one or more messages that describe the abnormal events within the designated territory as monitored by the sensors without sending any private data of the person to any external storage resource located outside the designated territory; and
a monitoring station outside the designated territory, the monitoring station is configured to receive the messages produced by the local processing system and to make the messages available to external observers.

2. The monitoring system as in claim 1, wherein the messages describe actions performed by a person or animal within the designated territory to allow an external observer to determine when external intervention is required.

3. The monitoring system as in claim 1 wherein the monitoring station produces an alarm when the messages describe actions performed by a person or animal that indicate an external intervention may be required.

4. The monitoring system as in claim 1 wherein the sensors are selected to monitor children, disabled, sick or old persons.

5. The monitoring system as in claim 1, wherein when the monitoring station forwards to the local processing system a query from an external observer, the local processor responds with a message, wherein contents of the message are based on activity within the designated territory detected by processing and analyzing the signals from the sensors.

6. The monitoring system as in claim 1, wherein the monitoring station produces an alert when the messages indicate a predetermined gesture or predetermined phrase is detected by the sensors.

7. The monitoring system as in claim 6, wherein the monitoring station cancels the alert when the messages indicate a predetermined cancelation gesture or predetermined cancelation phrase is detected by the sensors.

8. The monitoring system as in claim 1, wherein the local processing system internally identifies bodies of people and animals within the designated territory based on video data using at least one of the following techniques:
  face metric identification that identifies and records facial features;
  clothes metric identification that detects and records types of clothes on a body;
  body metric identification that detects and records body shapes;
  activity metric identification that detects and records current activity of a body;
  hair-cut metric identification that detects and records hair-cut style;
  tool metric identification that detects and records objects held or in near vicinity to a body.

9. The monitoring system as in claim 8, wherein the local processing system recognizes changes made to bodies within the designated territory and updates affected metric identifications.

10. The monitoring system as in claim 8, wherein the local processing system analyzes kinetic motion of identified bodies to detect and resolve inconsistencies when internally identifying bodies.

11. The monitoring system as in claim 10, wherein the local processing system additionally uses audio data to internally identify bodies of people and animals within the designated territory, the audio data including timbre metrics and relative sound amplitudes.

12. The monitoring system as in claim 1, wherein the local processing system internally identifies bodies of people and animals within the designated territory based on video data using more than one of the following techniques:
  face metric identification that identifies and records facial features;
  clothes metric identification that detects and records types of clothes on a body;
  body metric identification that detects and records body shapes;
  activity metric identification that detects and records current activity of a body;
  hair-cut metric identification that detects and records hair-cut style;
  tool metric identification that detects and records objects held or in near vicinity to a body.

13. The monitoring system as in claim 1, wherein the designated territory includes an area in at least one of the following:
  a school,
  a prison,
  a hospital,
  a shopping mall,
  a street,
  an office,
  a parking lot.

14. The monitoring system as in claim 1, wherein the designated territory comprises a plurality of rooms, the local processing system constructing a layout plan of the territory using video data from the sensors.

15. The monitoring system as in claim 14, wherein the local processing system additionally uses audio data to construct the layout plan.

16. The monitoring system as in claim 14, wherein when constructing the layout plan of the territory, the local processing system utilizes at least one of the following:
  estimates of room geometry based on detecting horizontal and vertical lines; detection of major objects within field of view of video sensors;
  neural network algorithms to recognize a room type form based a database of known room types;
  measurements based on requested configuration activities of a user within a room; configuration audio signals detected by audio sensors.

17. A method for monitoring activity within a designated territory, comprising:
  using sensors to make video recordings;
  forwarding signals from the sensors to a local processing system located within or proximate to the designated territory;
  processing and analyzing the signals from the sensors to recognize one or more activities or metrics via the local processing system;
  learning automatically over time from the recognized activities to include new metrics into consideration and to identify one or more abnormal events and/or the person associated with the abnormal events within the designated territory;

producing one or more messages that describe the abnormal events within the designated territory as monitored by the sensors;

sending the messages to a monitoring station outside the designated territory without sending any private data of the person to any external storage resource located outside the designated territory, wherein the monitoring station making the messages available to external observers.

18. The method as in claim 17, additionally comprising: producing an alert by the monitoring station when the messages indicate a predetermined gesture or predetermined phrase is detected by the sensors.

19. The method as in claim 17, additionally comprising: internally identifying bodies of people and animals within the designated territory based on video data using one or more of the following techniques:
   face metric identification that identifies and records facial features,
   clothes metric identification that detects and records types of clothes on a body,
   body metric identification that detects and records body shapes,
   activity metric identification that detects and records current activity of a body,
   hair-cut metric identification that detects and records hair-cut style, and
   tool metric identification that detects and records objects held or in near vicinity to a body.

20. The method as in claim 17, additionally comprising: recording audio data by the sensors, the audio data being used to internally identify bodies of people and animals within the designated territory, the audio data including timbre metrics and relative sound amplitudes.

21. The monitoring system as in claim 1 wherein the local processing system is configured to identify the abnormal events and/or the person associated with the abnormal events within the designated territory by recognizing a fragment of information of the person.

22. The monitoring system as in claim 1 wherein the abnormal events and/or the person associated with the abnormal events is identified based on a pattern of behavior of the person monitored over time.

23. The monitoring system as in 1 wherein the monitoring system is configured to decompose and analyze images extracted from the video recordings to identify the abnormal events and/or the person associated with the abnormal events.

24. The method as in claim 17 further comprising identifying the abnormal events and/or the person associated with the abnormal events within the designated territory by recognizing a fragment of information of the person.

25. The method as in claim 17 further comprising identifying the abnormal events and/or the person associated with the abnormal events based on a pattern of behavior of the person monitored over time.

26. The method as in claim 17 further comprising decomposing and analyzing images extracted from the video recordings to identify the abnormal events and/or the person associated with the abnormal events.

27. A monitoring system comprising:
   one or more sensors configured to generate signals to monitor activity within a designated territory, the sensors including visual sensors that make video recordings;
   a local processing system located within or proximate to the designated territory, the local processing system is configured to
      receive the signals from the sensors;
      process and analyze the signals from the sensors to recognize one or more activities or metrics;
      learn automatically over time from the recognized activities to include new metrics into consideration and to identify one or more abnormal events and/or the person associated with the abnormal events within the designated territory;
      store the signals and/or information learned in a storage of the local processing system located inside the designated territory;
      produce one or more messages that describe the abnormal events within the designated territory as monitored by the sensors; and
   a monitoring station outside the designated territory, the monitoring station is configured to receive the messages produced by the local processing system and to make the messages available to external observers.

28. A method for monitoring activity within a designated territory, comprising:
   using sensors to make video recordings;
   forwarding signals from the sensors to a local processing system located within or proximate to the designated territory;
   processing and analyzing the signals from the sensors to recognize one or more activities or metrics via the local processing system;
   learning automatically over time from the recognized activities to include new metrics into consideration and to identify one or more abnormal events and/or the person associated with the abnormal events within the designated territory;
   storing the signals and/or information learned in a storage of the local processing system located inside the designated territory;
   producing one or more messages that describe the abnormal events within the designated territory as monitored by the sensors;
   sending the messages to a monitoring station outside the designated territory, wherein the monitoring station making the messages available to external observers.

* * * * *